(12) United States Patent
Templeton et al.

(10) Patent No.: US 12,075,752 B2
(45) Date of Patent: Sep. 3, 2024

(54) CRATE APPARATUS FOR TRANSPORTING ANIMALS IN VEHICLES

(71) Applicant: Gordon Daniel Oke Templeton, Winnipeg (CA)

(72) Inventors: Gordon Daniel Oke Templeton, Winnipeg (CA); Meera Bhagwan Thadani, Winniipeg (CA)

(73) Assignee: Gordon Daniel Oke Templeton, Winnipeg (CA)

( * ) Notice: Subject to any disclaimer, the term of this patent is extended or adjusted under 35 U.S.C. 154(b) by 321 days.

(21) Appl. No.: 17/342,004

(22) Filed: Jun. 8, 2021

(65) Prior Publication Data

US 2021/0392848 A1 Dec. 23, 2021

Related U.S. Application Data

(60) Provisional application No. 63/042,674, filed on Jun. 23, 2020.

(51) Int. Cl.
*A01K 1/02* (2006.01)
*B60R 22/10* (2006.01)
*B60R 22/16* (2006.01)

(52) U.S. Cl.
CPC .......... *A01K 1/0272* (2013.01); *A01K 1/0245* (2013.01); *B60R 22/10* (2013.01); *B60R 22/16* (2013.01)

(58) Field of Classification Search
CPC .. A01K 1/0272; A01K 1/0245; A01K 1/0125; A01K 1/0236; A01K 31/08; A01K 1/0281; A01K 1/033; A01K 1/034; B60R 22/10; B60R 22/16; A61D 3/00
See application file for complete search history.

(56) References Cited

U.S. PATENT DOCUMENTS

| 2,530,148 | A | * | 11/1950 | Bjorklund | A01K 31/08 |
| | | | | | 119/474 |
| 3,195,506 | A | * | 7/1965 | Beard | B65D 7/26 |
| | | | | | 217/15 |
| 3,310,034 | A | * | 3/1967 | Dishart | B60R 22/10 |
| | | | | | 280/801.1 |
| 3,619,825 | A | * | 11/1971 | Taus | A47D 7/002 |
| | | | | | 5/944 |
| 4,010,880 | A | | 3/1977 | Guillot-Munoz | |

(Continued)

FOREIGN PATENT DOCUMENTS

GB 2324959 A * 11/1998 ........... A01K 1/0254

*Primary Examiner* — Tien Q Dinh
*Assistant Examiner* — Katelyn T Truong
(74) *Attorney, Agent, or Firm* — Ryan W. Dupuis; Michael R. Williams; Ade & Company Inc.

(57) ABSTRACT

An animal transport crate apparatus has an outer crate including rigid panels forming an outer boundary of an animal enclosure and an inner lining defining a flexible envelope arranged to receive the animal therein within the outer crate. Vehicle connecting tethers are arranged to extend through the outer crate for connection between the inner lining and frame anchors of the vehicle. The tethered inner lining allows the animal to be captured by the flexible envelope to minimize injury to the animal, and other occupants of the vehicle, regardless of the condition of the outer crate following a crash of the vehicle. The surrounding outer crate of rigid panels maintains ease of portability of the crate.

18 Claims, 21 Drawing Sheets

(56) References Cited

U.S. PATENT DOCUMENTS

| Patent/Pub. No. | | Date | Inventor | Classification |
|---|---|---|---|---|
| 4,512,286 | A * | 4/1985 | Rux | A01K 1/0272 119/771 |
| 4,583,253 | A * | 4/1986 | Hall | B60N 2/2854 5/655 |
| 4,834,420 | A * | 5/1989 | Sankrithi | B60R 22/10 297/250.1 |
| 4,977,857 | A | 12/1990 | Slawinski | |
| 5,479,892 | A * | 1/1996 | Edwards | B60R 21/02 297/250.1 |
| 5,522,344 | A * | 6/1996 | Demurjian | A01K 1/033 119/474 |
| 5,669,331 | A * | 9/1997 | Richmond | A01K 1/0245 119/497 |
| 5,718,191 | A * | 2/1998 | O'Donnell | A01K 1/0281 119/771 |
| 6,076,485 | A * | 6/2000 | Peeples | A01K 1/0254 119/500 |
| 6,092,488 | A * | 7/2000 | Allawas | A01K 1/0245 119/497 |
| 6,216,638 | B1 * | 4/2001 | Pivonka | A01K 1/0245 119/498 |
| 6,237,999 | B1 * | 5/2001 | Hobson | B60N 2/2806 297/256.16 |
| 6,345,591 | B1 * | 2/2002 | Richmond | A01K 1/0245 119/497 |
| 6,574,810 | B2 * | 6/2003 | Mangiaracina | A47D 13/08 D6/333 |
| 7,204,205 | B2 * | 4/2007 | O'Donnell | B60R 21/02 119/28.5 |
| 7,318,392 | B2 | 1/2008 | Rosen et al. | |
| 7,383,789 | B2 * | 6/2008 | Wilkes | A01K 1/0272 119/28.5 |
| 8,316,482 | B1 * | 11/2012 | Martin, III | A47D 9/00 5/655 |
| 8,555,429 | B2 * | 10/2013 | Leach | A01K 1/0353 4/572.1 |
| 8,607,735 | B1 * | 12/2013 | Klinker | A01K 27/002 119/28.5 |
| 9,226,473 | B2 * | 1/2016 | Hoffman | A01K 1/0035 |
| 2001/0042516 | A1 * | 11/2001 | Best Wright | A01K 1/0272 119/28.5 |
| 2005/0217599 | A1 * | 10/2005 | Varner | A01K 1/0281 119/496 |
| 2006/0278173 | A1 * | 12/2006 | Kamijo | A01K 1/0272 119/496 |
| 2008/0011234 | A1 * | 1/2008 | Wilkes | B60R 7/043 119/28.5 |
| 2009/0126638 | A1 * | 5/2009 | Bennett | A01K 1/0272 119/28.5 |
| 2010/0000472 | A1 | 1/2010 | Siklosi | |
| 2010/0288204 | A1 | 11/2010 | Costello et al. | |
| 2011/0132274 | A1 * | 6/2011 | Cagle | A01K 1/034 119/501 |
| 2017/0079238 | A1 * | 3/2017 | Renforth | A01K 1/033 |
| 2018/0359985 | A1 * | 12/2018 | Jung | A01K 29/005 |
| 2019/0202564 | A1 * | 7/2019 | Jung | B64D 11/003 |
| 2019/0208739 | A1 * | 7/2019 | Pozzi | A01K 29/005 |
| 2019/0233112 | A1 * | 8/2019 | Seta | A01K 1/0047 |
| 2019/0380299 | A1 * | 12/2019 | Shewfelt | B60R 22/10 |
| 2021/0120778 | A1 * | 4/2021 | Prehogan | A01K 1/0245 |
| 2022/0053732 | A1 * | 2/2022 | Bassi | A01K 1/0245 |

* cited by examiner

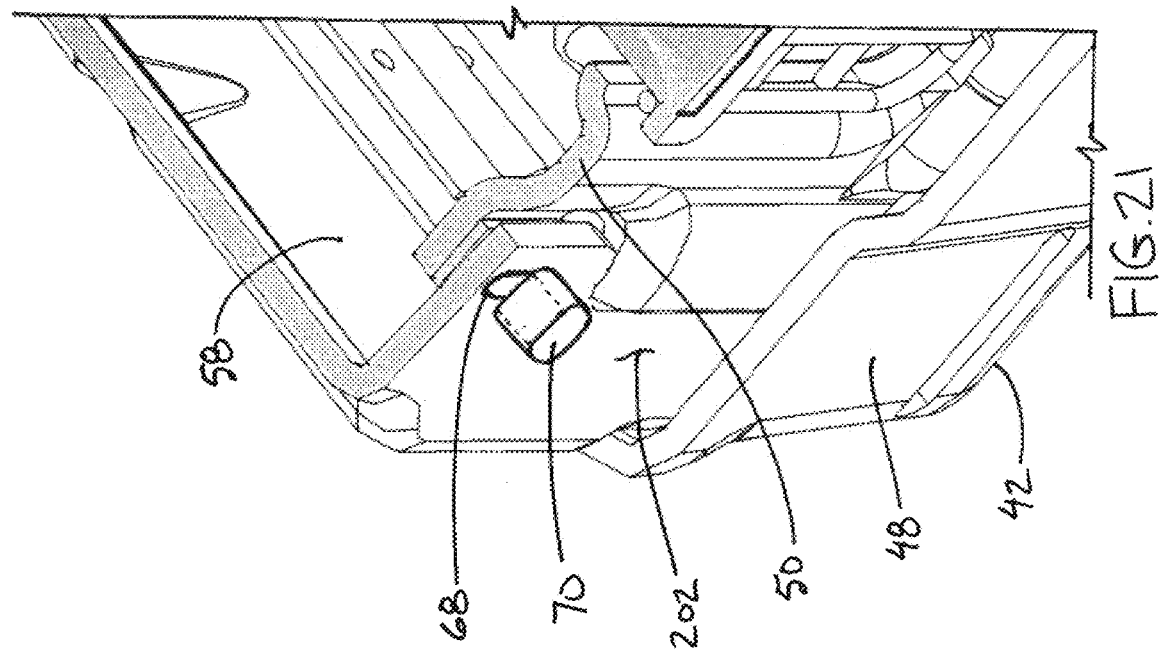
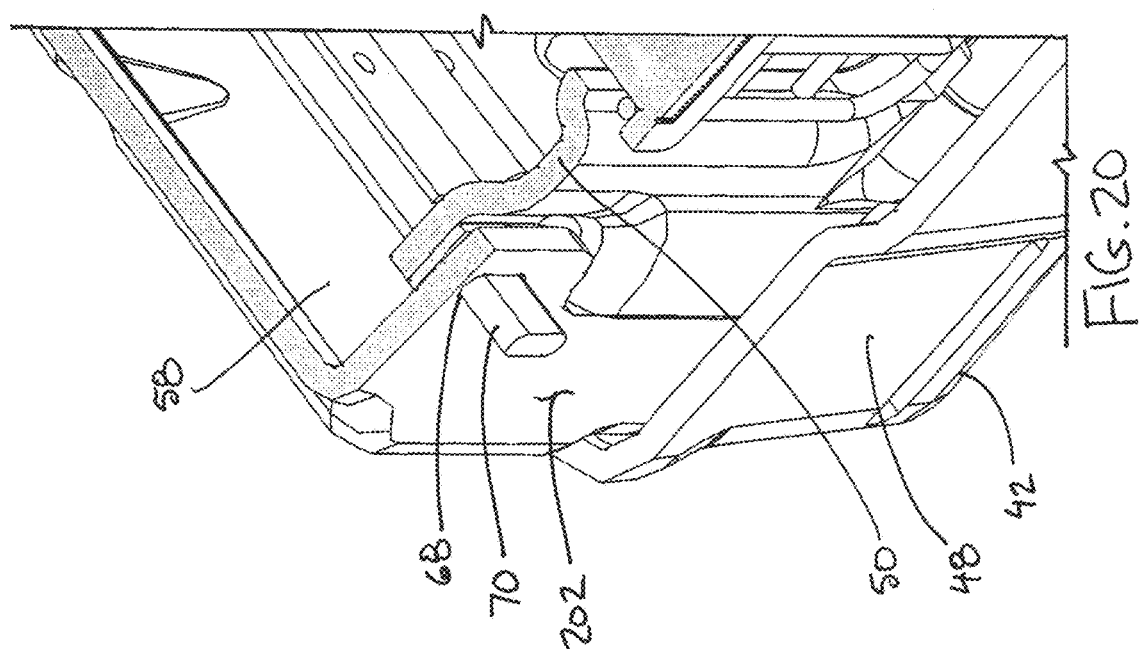

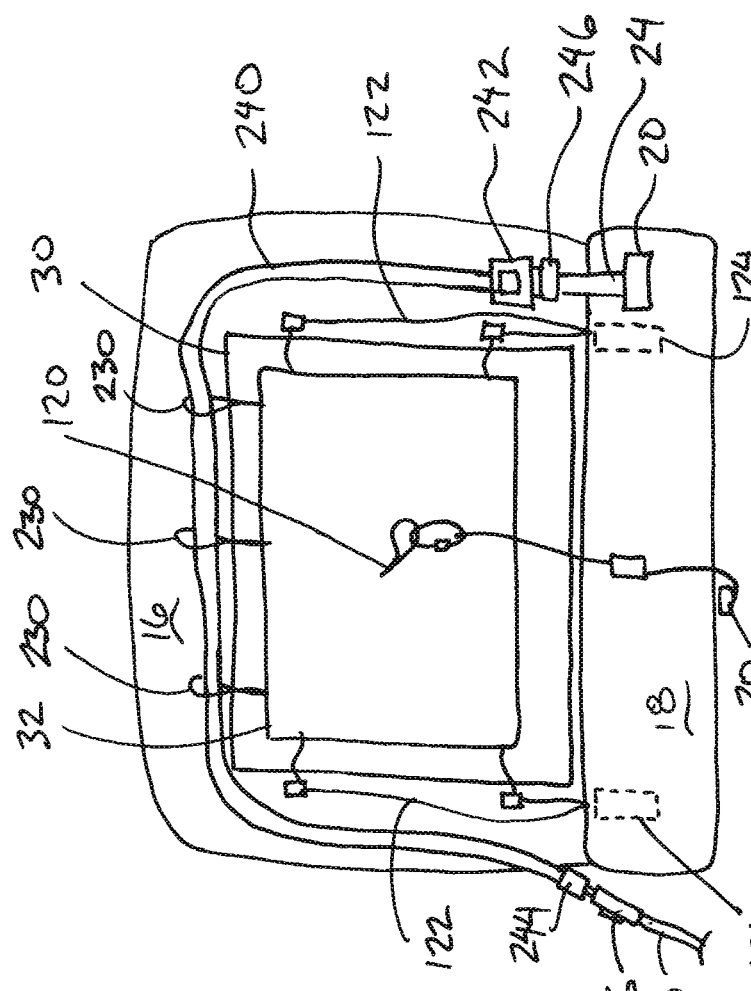
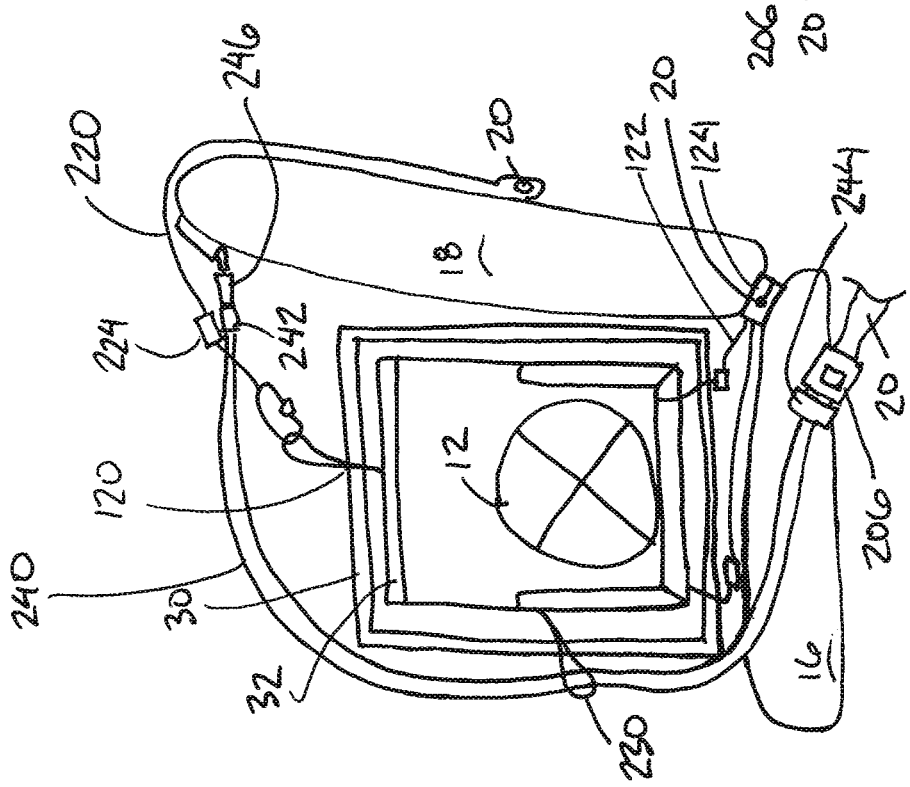

CRATE APPARATUS FOR TRANSPORTING ANIMALS IN VEHICLES

This application claims the benefit under 35 U.S.C.119(e) of U.S. provisional application Ser. No. 63/042,674, filed Jun. 23, 2020.

FIELD OF THE INVENTION

The present invention relates to a crate apparatus for receiving an animal therein for transport of the animal, and more particularly the present invention relates to an animal transport crate that can be secured within a transport vehicle.

BACKGROUND

Various devices are known for containing and transporting animals therein in the form of crates typically having rigid outer walls and a door through which the animal can enter and exit the crate. Such crates are typically transported on vehicular seats without any form of restraint such that the crate can be thrown about the vehicle in the event of a collision. Even when the crate is restrained relative to the vehicle, the rigid structure of the crate is either immovable in a manner that causes injury to the animal, or more likely the rigid structure simply ruptures under the impact by the animal such that the animal is thrown about the interior of the vehicle in a manner that again results in serious injury to the animal or other occupants of the vehicle.

SUMMARY OF THE INVENTION

According to one aspect of the invention there is provided an animal transport crate apparatus for transporting an animal within a vehicle having frame anchors, the apparatus comprising:
- an outer crate including rigid panels forming an outer boundary of an animal enclosure;
- an inner lining received within the outer crate, the inner lining defining a flexible envelope arranged to receive the animal therein within the outer crate;
- at least one vehicle connecting tether extending through a respective tether opening in the outer crate, said at least one vehicle connecting tether being arranged to be connected between the inner lining and the frame anchors of the vehicle.

The use of an inner lining within a rigid outer crate in which the inner lining forms a flexible envelope receiving the animal therein, together with vehicle connecting tether switch specifically anchor the inner lining relative to the outer crate allow the animal to be captured by the flexible envelope to minimize injury to the animal, and other occupants of the vehicle, regardless of the condition of the outer crate following a crash of the vehicle. In some instances the rupturing of the outer crate slows down the movement of the animal following a crash of the vehicle such that the rupturing of the crate can reduce the severity of an impact of the animal with surrounding structures in the vehicle while the animal remains protected by the surrounding flexible envelope of the inner lining to reduce injury to the animal. The combination of the inner lining tethered to the vehicle while being supported within a surrounding outer crate of rigid panels maintains the ease of portability of the crate for loading and unloading of the crate relative to the vehicle.

Preferably said at least one vehicle connecting tether includes one or more lower tethers extending through the respective tether opening in proximity to a bottom of the outer crate. More particularly, said at least one vehicle connecting tether may include a lower tether extending through the respective tether opening in proximity to a bottom of the outer crate and an upper tether extending through the respective tether opening in proximity to a top of the outer crate.

The flexible envelope may be arranged to be constricted about the animal therein responsive to said at least one vehicle connecting tether being pulled outwardly relative to the outer crate. The apparatus may further include a breakaway element connecting a portion of said at least one vehicle connecting tether to the inner lining so as to prevent constricting of the flexible envelope, in which the breakaway element is arranged to be separated in response to a pulling force on said at least on vehicle tether that exceeds a prescribed holding force of the breakaway element such that the inner lining is only arranged to be constricted in response to the pulling force on said at least one vehicle connecting tether exceeding said prescribed holding force.

The flexible envelope may include an upper panel adjacent a top of the outer crate and a lower panel adjacent a bottom of the outer crate separated by a gap in a normal mounted position within the outer crate, in which the upper panel and the lower panel are arranged to be drawn together as the flexible envelope is constricted by said at least one vehicle connecting tether. Preferably the gap between the upper panel and the lower panel of the flexible envelope is aligned with a window opening in the outer crate in the normal mounted position.

When the vehicle connecting tether includes a plurality of lower tethers extending through the respective tether openings in proximity to a bottom of the outer crate and an upper tether extending through the respective tether opening in proximity to a top of the outer crate, the apparatus may further include: (i) a lower mounting arrangement connected to the lower tethers in which the lower mounting arrangement is arranged to be connected to a pair of lower seat anchors on the vehicle frame in proximity to a lower seating surface on the vehicle, and (ii) an upper mounting arrangement connected to the upper tether in which the upper mounting arrangement is arranged to be connected to a mounting location on the vehicle at a location spaced above the lower seating surface on the vehicle.

The upper mounting arrangement may comprise the anchoring location for a shoulder strap of a vehicle seatbelt system, or a tether connected to the upper anchoring location used to releasably securing the upper portion of a child car seat.

The flexible envelope may be arranged to be constricted about the animal therein only in response to the lower tethers being pulled outwardly relative to the outer crate.

When the vehicle connecting tether includes a plurality of lower tethers extending through the respective tether openings in proximity to a bottom of the outer crate, the lower mounting arrangement may be arranged to be connected to a pair of lower seat anchors on the vehicle frame in proximity to a lower seating surface on the vehicle in which the lower tethers are connected to the lower mounting arrangement so as to be readily releasable therefrom for removing the apparatus from the vehicle.

When the outer crate is generally rectangular in shape so as to have four bottom corners, the at least one vehicle connecting tether may include four lower tethers extending through the respective tether openings in proximity to the four bottom corners of the outer crate respectively.

The inner lining is preferably secured to an inner surface of the outer crate using a plurality of releasable mating connectors.

The outer crate may be elongate in a longitudinal direction between opposing ends of the outer crate in which a door mounted on one of the ends of the outer crate so as to be pivotal between open and closed positions relative to a door opening at the end of the outer crate. In this instance, the inner lining is preferably generally tubular in shape about a longitudinal axis of the inner lining in alignment with the longitudinal direction of the crate so as to define an opening in the flexible envelope in alignment with the door opening in the outer crate.

When the at least one vehicle connecting tether includes two lower tethers extending through the respective tether openings in proximity to a bottom of the outer crate, the two lower tethers are preferably at spaced apart positions relative to one another in the longitudinal direction of the outer crate so as to be arranged to support the outer crate such that the longitudinal direction extends transversely to a forward working direction of the vehicle.

The rigid panels of the outer crate may comprise a top panel, a bottom panel, and a plurality of wall panels pivotally coupled between the top panel and the bottom panel such that the outer crate is collapsible from (i) a working position in which the top panel is spaced above the bottom panel to define the animal enclosure arranged to receive the animal therein to (ii) a collapsed position in which the top panel is adjacent to the bottom panel such that the outer crate is reduced in height relative to the working position.

The wall panels may comprise: (i) two end panels at longitudinally opposing ends of the outer crate, each end panel being hinged onto one of the top panel or the bottom panel for pivotal movement between the working position and the collapsed position, (ii) two upper side panels hinged onto the top panel at opposing sides of the outer crate respectively, and (iii) two lower side panels hinged onto the bottom panel at the opposing sides of the outer crate respectively, the lower side panels being hinged onto the two upper side panels respectively such that the lower side panels and the upper side panels are folded inwardly against one another in the collapsed position relative to the working position.

When the upper side panels and the lower side panels define a foldable wall at each of the opposing sides of the outer crate in which each foldable wall comprises one of the upper side panels and a corresponding one of the lower side panels connected thereto for relative pivotal movement about a folding axis of the foldable wall, preferably a first one of the side panels of each foldable wall protrudes beyond the folding axis in overlapping arrangement against an inner surface of a second one of the side panels of that foldable wall so as to prevent outward movement of the foldable wall beyond the working position.

One of the side panels at each side of the outer crate may comprise a first mating connector formed thereon, while each of the end panels comprises a second mating connector formed thereon, in which each first mating connector is arranged to mate with a respective one of the second mating connectors for relative sliding movement in the longitudinal direction as the end panel that supports the first mating connector thereon is pivoted into the working position relative to the side panels in the working position. Preferably mating of the first mating connectors with the second mating connectors prevents displacement of the side panels from the working position to the collapsed position, and preferably one mating connector of the first and second mating connectors is operable from (i) an unlocked state allowing relative sliding movement between the mating connectors to release the end panel from the working position to the collapsed position to (ii) a locked state preventing relative sliding movement between the mating connectors to retain the end panel in the working position.

The apparatus may further include a securing arrangement arranged to secure and retain the outer crate in the working position in which the securing arrangement comprises at least one resilient member secured at opposing ends on opposing edge portions of a first panel among the top panel and the bottom panel. In this instance, said at least one resilient member is preferably resiliently deformable between (i) a first configuration extending across an exterior of the first panel so as not to obstruct displacement of the outer crate between the working position and the collapsed position, and (ii) a second configuration extending across an exterior of a second panel among the top panel and the bottom panel while the outer crate is in the collapsed position so as to prevent displacement of the outer crate from the collapsed position to the working position.

The outer crate may further comprise a camera mount supported on one of the rigid panels and supporting a camera thereon such that the camera is arranged to capture images of an interior of the outer crate, the camera being removable from an exterior of the outer crate.

BRIEF DESCRIPTION OF THE DRAWINGS

Various embodiments of the invention will now be described in conjunction with the accompanying drawings in which:

FIG. 20 is a partly sectional, perspective view of the first and second mating connectors to retain the apparatus in the working position when the second mating connectors are in an unlocked state;

FIG. 21 is a partly sectional, perspective view of the first and second mating connectors to retain the apparatus in the working position when the second mating connectors are in a locked state;

FIG. 27 is an end view of the apparatus supported on a vehicle seat according to a further embodiment of the upper tether; and FIG. 28 is a top plan view of the apparatus according to the embodiment of FIG. 27.

In the drawings like characters of reference indicate corresponding parts in the different figures.

DETAILED DESCRIPTION

Figure 1:
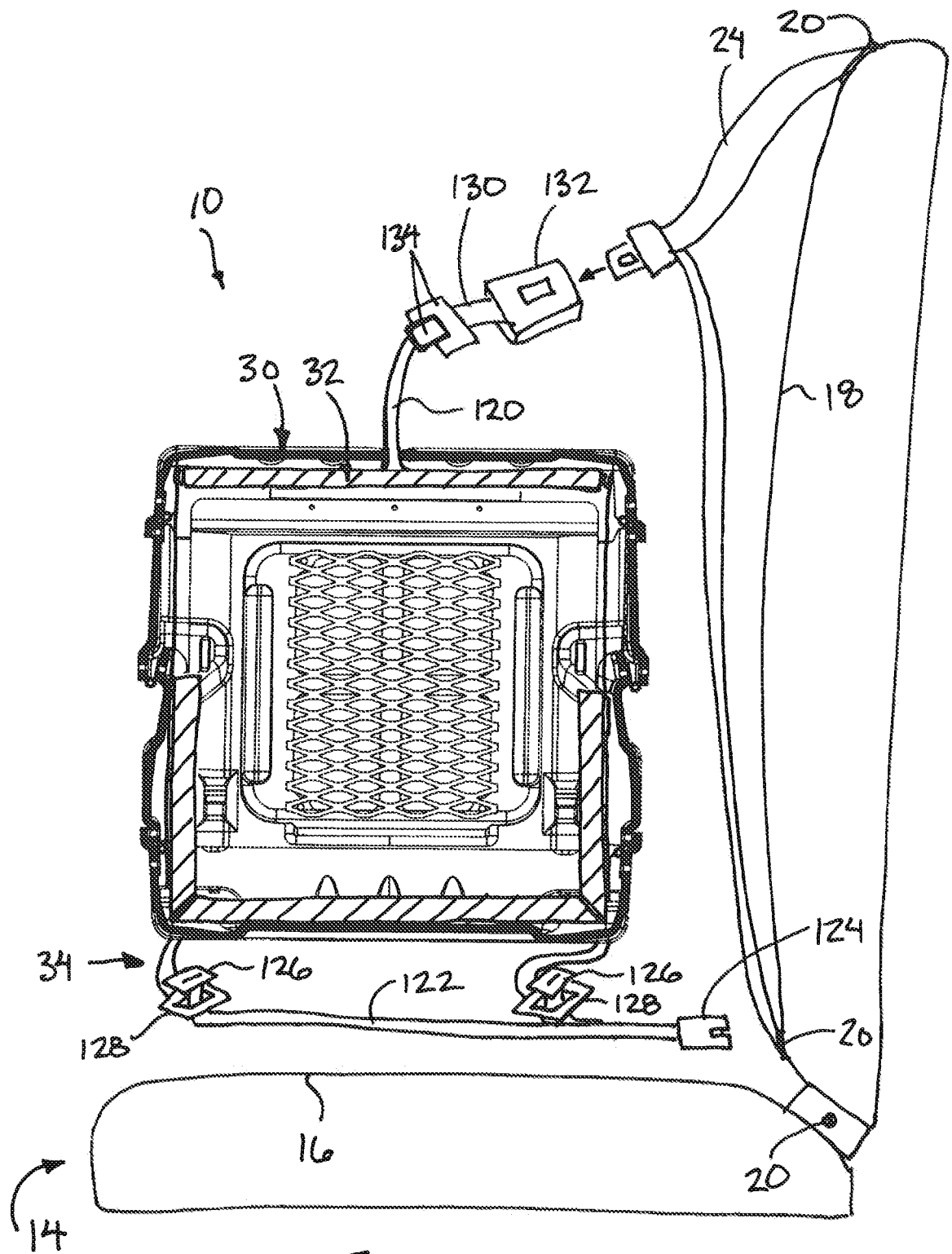
FIG. 1 is a partly sectional end elevational view of the crate apparatus supported in relation to a vehicle seat for transporting an animal therein according to a first embodiment.

Referring to the accompanying figures, there is illustrated an animal transport crate apparatus generally indicated by reference numeral 10. The apparatus 10 is particularly suited for use in transporting an animal 12 within a passenger vehicle.

In the illustrated embodiments, the passenger vehicle includes a seat 14 having a lower seating surface 16 arranged to receive a user seated thereon with a backrest 18 extending upwardly from a rear edge of the lower seating surface 16. A pair of frame anchors 20 are fixedly mounted relative to the frame of the vehicle at spaced apart positions across the rear end of the lower seating surface 16 below the backrest 18. The frame anchors 20 are spaced apart in a lateral direction of the vehicle that is perpendicular to a forward working direction of the vehicle. The frame anchors 20 form part of a latching system commonly used for anchoring child seats relative to a vehicle. The rear seat is further provided with a seatbelt 24 having a lower waist portion 24A and an upper portion 24B anchored near the top of the backrest 18. The seatbelt 24 is also anchored to respective frame anchors of the vehicle frame. The vehicle seat may also include an upper frame anchor 20 in fixed relation to the frame of the vehicle at a location rearwardly of the backrest for use in securing the upper portion of a child's car seat for example.

The apparatus 10 is typically used with a rear passenger seat 14 of the vehicle such that an additional front passenger seat 22 may be positioned within the vehicle at a location spaced forwardly of the rear seat 14.

The apparatus 10 according to all embodiments generally includes (i) an outer crate 30 forming the rigid outer boundary of an animal enclosure for receiving an animal therein; (ii) an inner lining 32 defining a flexible envelope for lining the outer crate 30 and for further receiving the animal therein when the lining is received within the outer crate; and (iii) at least one vehicle connecting tether 34 for connection between the inner lining 32 and one or more frame anchors 20 of the passenger vehicle by communicating through respective tether openings 36 formed in the outer crate.

In a preferred arrangement, the vehicle connecting tethers are arranged such that outward pulling of the tethers relative to the outer crate 30 by displacement of the outer crate 30 away from the frame anchors 20 following a crash of the vehicle will result in the inner lining 32 being constricted about the animal to contain the animal regardless of the condition of the outer crate 30 which may rupture during the crash.

Figure 8:
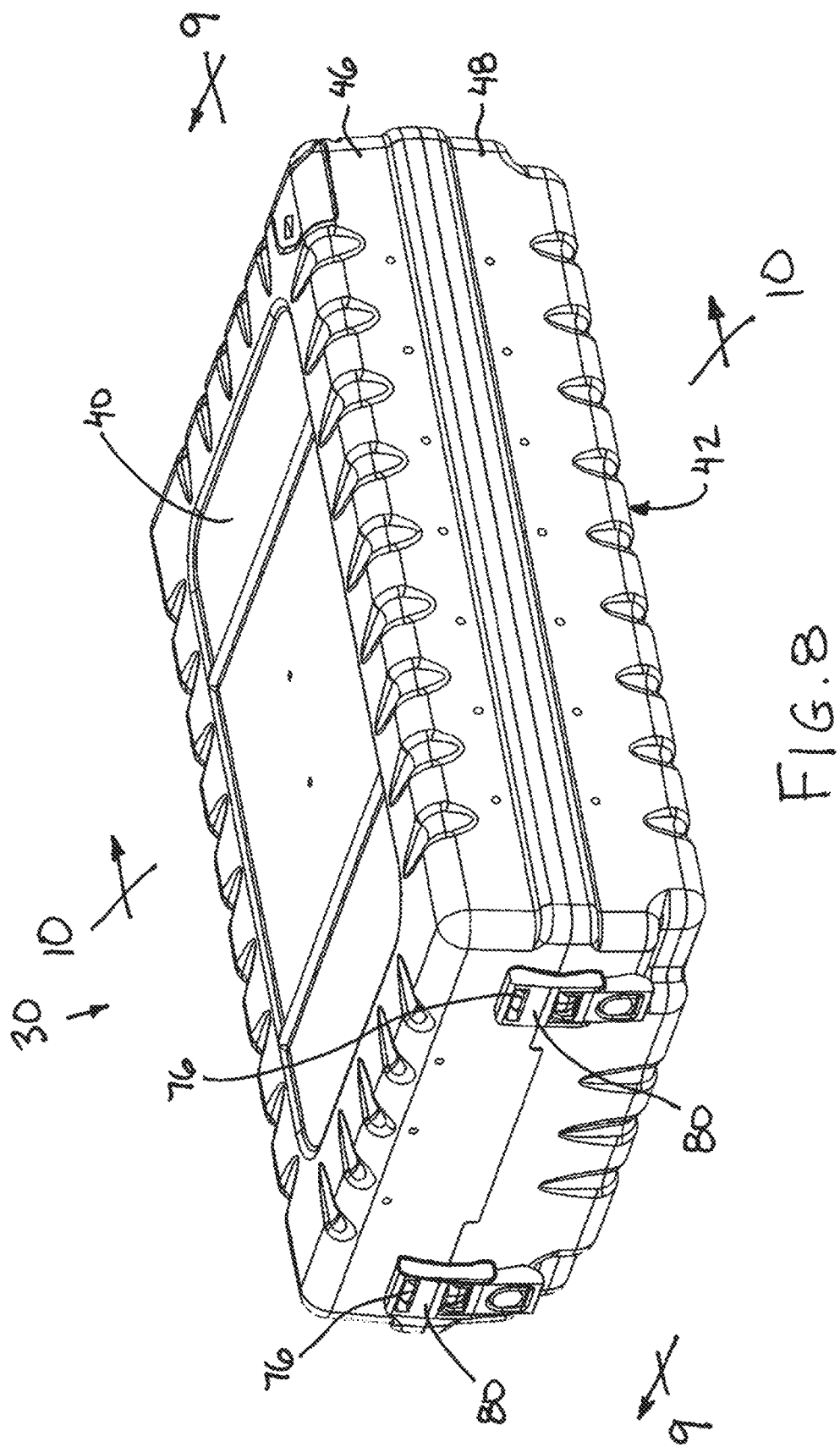
FIG. 8 is a perspective view of the outer crate in the collapsed position, according to the first embodiment of FIG. 1.

Turning now more particularly to the first embodiment of FIGS. 1 through 15, the outer crate 30 is generally elongate in a longitudinal direction between two opposing ends 38 of the apparatus. The outer crate further includes two sides which are parallel and spaced apart from one another to extend in the longitudinal direction between the opposing ends 38 at laterally opposing sides of the outer crate. The outer crate generally comprises a top panel 40 at the top end of the outer crate, a bottom panel 42 at the bottom end of the crate, and a plurality of wall panels 44 pivotally connected between the top and bottom panels such that the outer crate is operable between a working position shown in FIG. 4, and a collapsed position shown in FIG. 8. In the working position, the top panel 40 is spaced above the bottom panel 42 and the wall panels 44 are in an upright orientation extending between the top and bottom panels. Alternatively, in the collapsed position, the top panel is collapsed downwardly relative to the working position so as to be located in proximity to the bottom panel with the wall panels 44 being approximately horizontal in orientation between the top and bottom panels to reduce the overall height of the crate in the collapsed position relative to the working position.

The top panel 40 includes a rectangular flat sheet at the top end thereof and a perimeter wall portion 46 extending downwardly from a perimeter edge of the flat top sheet about the full perimeter thereof to a bottom edge of the perimeter wall portion 46 lying in a common plane parallel to the flat top sheet. The bottom panel 42 similarly includes a rectangular flat sheet at the bottom end thereof and a perimeter wall portion 48 extending upwardly from a perimeter edge of the flat bottom sheet about the full perimeter thereof to a top edge of the perimeter wall portion 48 lying in a common plane parallel to the flat bottom sheet. In the collapsed position, the top edge of the bottom perimeter wall portion 44 abuts against the bottom edge of the top perimeter wall portion to form a closed receptacle fully receiving the wall panels 44 folded into the collapsed positions thereof within the enclosed hollow interior of the closed receptacle.

Figure 9:
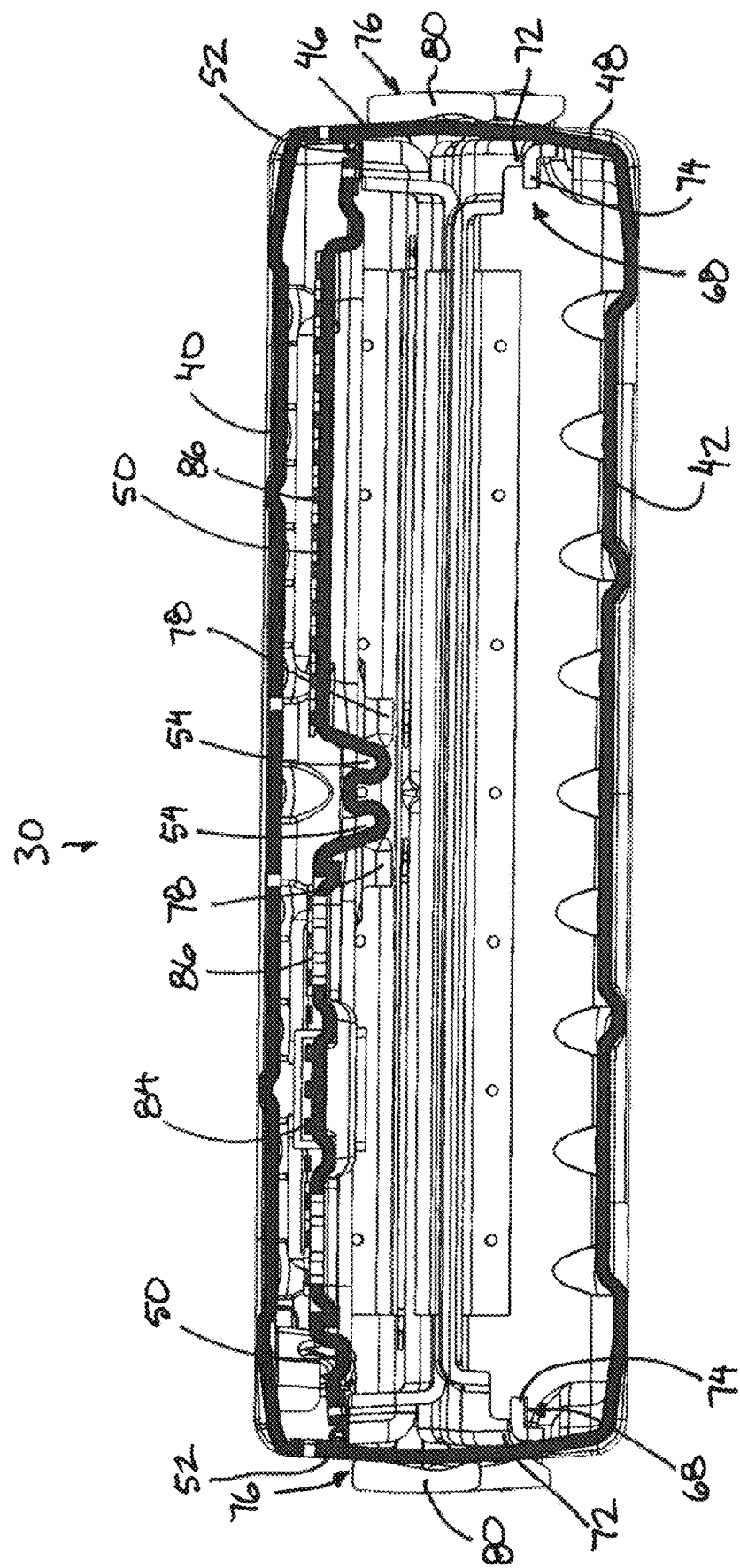
FIG. 9 is a sectional view along the line 9-9 in FIG. 8.

The wall panels 44 include two end panels 50 which are each coupled by respective top hinges 52 to respective ones of the longitudinally opposed ends of the top panel 40. More particularly, each end panel 50 is coupled pivotally to an inner surface of the respective perimeter wall portion 46 at a location spaced upwardly from the bottom edge thereof. In this manner, each of the end panels can be pivoted upwardly and inwardly from the working position to the collapsed position so as to lie generally parallel with the flat top sheet in the collapsed position. The location of the top hinge 52 ensures that the end panel 50 abuts the inner surface of the perimeter wall portion in the working position to prevent further pivotal movement of the end panel away from the collapsed position beyond the working position shown in FIG. 6. Both end panels have a height between top and bottom edges thereof which is approximately equal to half of the overall length of the top panel in the longitudinal direction such that the end panels 50 can be abutted longitudinally in series with one another in the collapsed position as generally shown in FIG. 9.

The bottom end of each end panel 50 includes a resilient hook 54 formed thereon which forms a catch that anchors the bottom end of the end panel relative to the top edge of the perimeter wall portion 48 of the bottom panel in the working position. Each end panel 50 is thus retained in the working position until the resilient hook 54 is resiliently deformed to release the catch from the top edge of the bottom perimeter wall portion 48.

The wall panels 44 also include two upper side panels 56 and two lower side panels 58 which collectively form two foldable walls at the two laterally opposed sides of the outer crate respectively. More particularly each foldable wall comprises one of the upper side panels 56 pivotally coupled to a respective side of the top panel by a respective top hinge 60 and a corresponding one of the lower side panels 58 pivotally coupled to the respective side of the bottom panel by a respective bottom hinge 62. The upper side panel 56 extends downwardly approximately half of the overall height between the top and bottom panels in the working position, while the lower side panel extends upwardly approximately half of the overall height between the top and bottom panels in the working position. In this manner the top end of the lower side panel 58 can be pivotally coupled to the bottom of the upper side panel 56 by an intermediate hinge 64.

The top hinge 60, the bottom edge 62 and the intermediate hinge 64 each define respective pivot axes which are parallel to one another and parallel to the longitudinal direction of the crate. The intermediate hinge 64 in particular defines a folding axis of pivotal movement of the respective upper side panel 56 relative to the respective lower side panel 58 coupled to one another by the hinge. The side panels are folded into the collapsed position from the working position by folding the bottom end of the upper side panel inwardly and the top end of the lower side panel inwardly such that the fold axis defined by the intermediate hinge 64 therebetween is displaced laterally inwardly from the outer boundary of the outer crate to a central location within the interior of the collapsed outer crate.

Each lower side panel 58 further includes a protruding flange 66 which extends upward from the lower side panel 58 in the working position beyond the fold axis of the intermediate hinge 64 at the inner side of the upper side panel 56. The overlap of the protruding flange 66 along the inner surface of the upper side panel functions as a stop to prevent relative pivotal movement between the upper and lower side panels away from the collapsed position beyond the working position.

Additional support for retaining the side panels in the working position is provided by a set of first mating connectors 68 on the lower side panels 58 for cooperation with second mating connectors 70 on the end panels 50. More particularly, each lower side panel includes two of the connectors 68 thereon at longitudinally opposed ends in proximity to the top end thereof. Each mating connector 68 includes a support arm 72 extending upwardly and longitudinally outwardly from the end of the lower side panel and a locking tab 74 extending inwardly in the longitudinal direction towards the opposing end of the outer crate. Each second mating connector 70 comprises a slot formed on one of the end panels 50 for alignment with a corresponding one of the first mating connectors 68 in the working position. In this manner a pair of second mating connectors 70 is provided at laterally spaced apart positions on each end panel 50 at an intermediate location in proximity to a center of the panel in the vertical direction.

When displacing the outer crate from the collapsed position to the working position, the upper and lower side panels are initially unfolded from the collapsed position in which the side panels lay generally horizontally and flat against one another to the working position in which the side panels are in an upright orientation one above the other. The end panels are subsequently folded downwardly from the collapsed position against the top panel towards the working positions thereof. As each panel approaches the upright orientation of the working position, the slot forming each second mating connector 70 interacts by relative sliding movement in the longitudinal direction with the corresponding one of the first mating connectors received therein. Once the end panels reached the working position, the locking tabs 74 forming the first mating connectors protrude longitudinally through the corresponding slot forming the second mating connectors 70 in a manner which prevents any subsequent lateral movement of the side panels, thus retaining the side panels in the working position provided that the end panels remain in the working positions thereof.

A latching arrangement is provided for retaining the end panels in either one of the working position or the collapsed position. More particularly, the latching arrangement includes a pair of first mating connectors 76 formed on the exterior of the top panel at laterally spaced apart positions at each end of the top panel. A total of four first mating connectors 76 are thus provided on the top panel at a location on the upright perimeter wall portion 46 thereof in proximity to the four corners of the rectangular shape of the top sheet of the outer crate. Each first mating connector 76 comprises a protruding lug defining a catch thereon.

Each of the end panels 50 further comprises a pair of second mating connectors 78 formed thereon at laterally spaced apart positions across the bottom of the end panel. In this manner a total of four second mating connectors 78 are provided in proximity to the four corners of the rectangular shape of the bottom panel of the outer crate in the working position. Each second mating connector 78 comprises a protruding lug defining a catch thereon.

The latching arrangement further includes a set of four primary mating connectors 80 in which two of the primary mating connectors 80 are provided at each of the longitudinally opposed ends of the bottom panel 42 at laterally spaced apart positions thereon. More particularly the primary mating connectors are located in proximity to the four bottom corners of the rectangular shape of the bottom panel of the outer crate respectively. The primary mating connectors 80 are supported on the upright perimeter wall portion 76 of the bottom panel 42 in vertical alignment with one of the first mating connectors 80 thereabove at least in the collapsed position, and in vertical alignment with one of the second mating connectors 78 in the working position.

Each primary mating connector 80 comprises a pivotal latch which (i) cooperates with a corresponding one of the first mating connectors to be selectively hooked onto the catch thereof in the collapsed position for retaining the outer crate in the collapsed position, and (ii) cooperates with a corresponding one of the second mating connectors to be selectively hooked onto the catch thereof in the working position for retaining the outer crate in the working position. Each latch is pivotal between a locked condition engaged upon the respective catch of the corresponding mating connector to prevent displacement of the outer crate from the corresponding working position or collapsed position, and a released condition in which the latch is released from the respective catch of the corresponding mating connector to allow the outer crate to be displaced between the working and collapsed positions.

The outer crate further comprises a door opening 82 formed in a first one of the end panel 50. The first one of the end panels 50 further includes a door panel 84 hinged to the end panel along one side edge of the door opening and one side edge of the door panel such that the door panel is pivotal between a closed position spanning across the door opening 82 and an open position in which the hollow interior of the crate is accessible through the door opening which is substantially unobstructed by the door panel.

The door panel 82, the second one of the end panels 50, and both upper side panels 56 are each provided with one or more window openings 86 formed therein with a panel of rigid mesh material spanning across the window opening to form a breathable boundary portion of the outer crate that allows air flow therethrough.

The tether openings 36 in the outer crate include four lower tether openings located in proximity to the four corners of the rectangular bottom panel 42 respectively and one upper tether opening located at a central location communicating through the top sheet of the top panel 40. The tether openings 36 receive respective vehicle connecting tethers 34 therethrough as described in further detail below.

The outer crate 30 further includes a camera mounting arrangement for supporting a wireless web cam 88 on the outer crate. More particularly the camera mounting arrangement comprises an access panel 90 releasably mounted within a respective access opening formed in one of the top corners of the top panel 40. The access panel 90 mates with the access opening to be linearly slidable into and out of a mounted position relative to the rigid structure of the outer crate 30. A resilient catch 92 is formed on the access panel to be selectively received within a retainer opening formed on the top panel 40 of the crate which selectively retains the access panel 90 in a closed position spanning across the access opening in fixed relation to the crate. The resilient catch 92 can be resiliently deformed to remove the interference between the catch and the boundary of the retainer opening such that the access panel can be slidably removed from the top panel 40 to an open position of the camera mounting arrangement.

An inner surface of the access panel 90 includes a socket 94 formed therein within which the rectangular housing of the camera 88 can be slidably received such that the camera is directed downwardly and inwardly towards a central area within the hollow interior of the outer crate when the access panel is mounted on the top panel 40 of the crate. A retainer flange 96 is formed on the inner surface of the top panel 40 to be positioned for partly closing the open side of the socket 94 receiving the camera 88 therein in the closed position of the access panel 90 such that mounting of the access panel within the top panel 40 of the crate causes the retainer flange 96 to effectively retain the camera 88 within the socket 94 without blocking the lens of the camera such that the camera remains capable of capturing video images of the interior of the apparatus 10 for transmitting the images to an external electronic device by wireless communication. The access panel 90 allows the camera 88 to be removed from the crate through access from the exterior of the crate by removing the access panel 90 from the crate followed by removal of the camera from the access panel in the open position of the camera mounting arrangement.

The inner lining 32 of the apparatus 10 generally includes an upper panel 100 positioned along the inner surface of the top panel 40 and a lower panel 102 positioned along the inner surface of the bottom panel 42 of the outer crate. The upper panel 100 comprises a flat rectangular pad of resilient material covered with fabric so as to remain flexible and so as to substantially span the bottom of the flat top sheet of the top panel 40 of the outer crate.

The lower panel 102 includes a bottom pad 104 which is a rectangular pad of resilient material covered with fabric so as to remain flexible and so as to substantially span the top of the flat bottom sheet of the bottom panel 42 of the outer crate. The lower panel 102 further includes a pair of side pads 106 which are generally rectangular in shape and which are similarly formed of resilient material covered in fabric. The side pads 106 extend upwardly from opposing side edges of the lower panel 102 along the length thereof in the longitudinal direction. Each side pad as a height corresponding approximately to half a height of the outer crate between the top panel and the bottom panel thereof so as to substantially fully span the inner surfaces of the two lower side panels 58 respectively.

The inner lining further remains open at both of the longitudinally opposed ends across the full width and full height of the flexible envelope defined by the inner lining.

A gap is provided in the inner lining between the top edge of the side pads 106 and the upper panel 100 spaced thereabove in which the gap is aligned with window openings 86 formed in the upper side panels 56 respectively. A plurality of connecting straps 108 are connected between the upper panel 100 and the lower panel 102 at longitudinally spaced positions along each of the opposing sides of the crate. Along each side a set of three connecting straps 108 are provided such that the straps are provided at each of the longitudinally opposed ends and the third strap is provided at a central location between the opposing ends.

Each side connecting strap 108 is connected at the top end of the strap 108 to the top end of a corresponding connecting strap 108 at the opposing side of the crate by a top strap 110 extending laterally across the top side of the top panel. The side connecting straps 108 and the top strap 110 comprise a woven, non-elastic material. The top strap 110 is stitched in fixed relation to the top pad. The top end of the side connecting straps 108 are connected in fixed relation to the corresponding top strap 110 at the top end of the side connecting strap while the intermediate portion of each side connecting strap is connected to the respective side pad 106 of the lower panel 102 of the lining by a sliding connection described in further detail below.

The upper panel 100, the lower panel 102, the side connecting straps 108, and the top strap 110 collectively form a tubular structure surrounding a longitudinally oriented axis of the outer crate that extends between the opposing open ends of the inner lining.

The inner lining 32 is secured to the inner surface of the outer crate using a plurality of cooperating snap fasteners 112 in which some of the fasteners comprise male fasteners and some of the fasteners comprise female fasteners receiving respective male fasteners therein in a releasable manner.

In the illustrated embodiment, fasteners are provided at longitudinally spaced positions along the top side of the upper panel 100 and the outer sides of the side pads 106 and the bottom of the bottom pad 104 for cooperating and selectively connecting with corresponding fasteners located on the inner surfaces of the top panel 40, the bottom panel 42, and the lower side panels 58 of the outer crate.

Figure 10:
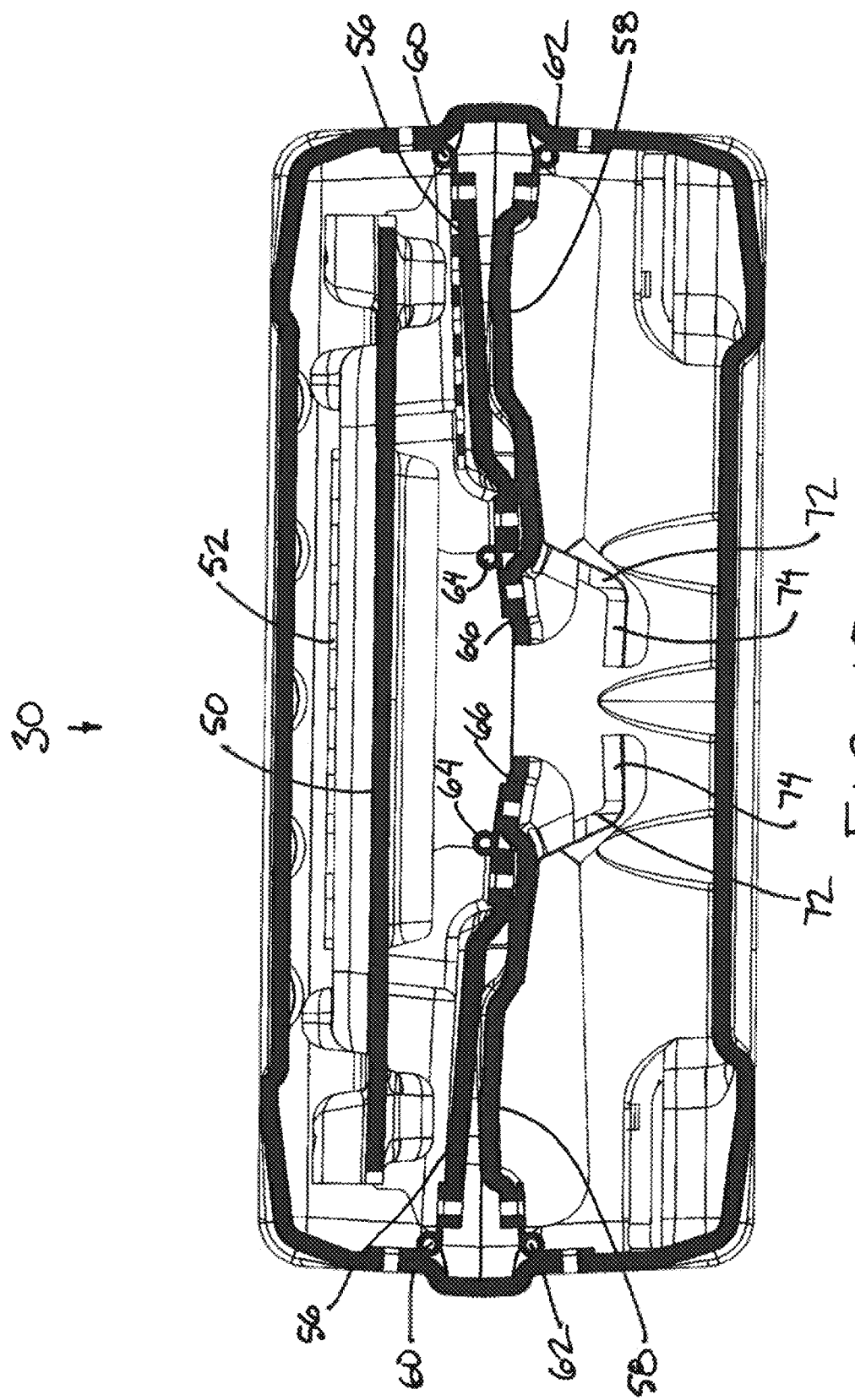
FIG. 10 is a sectional view along the line 10-10 in FIG. 8.
Figure 11:
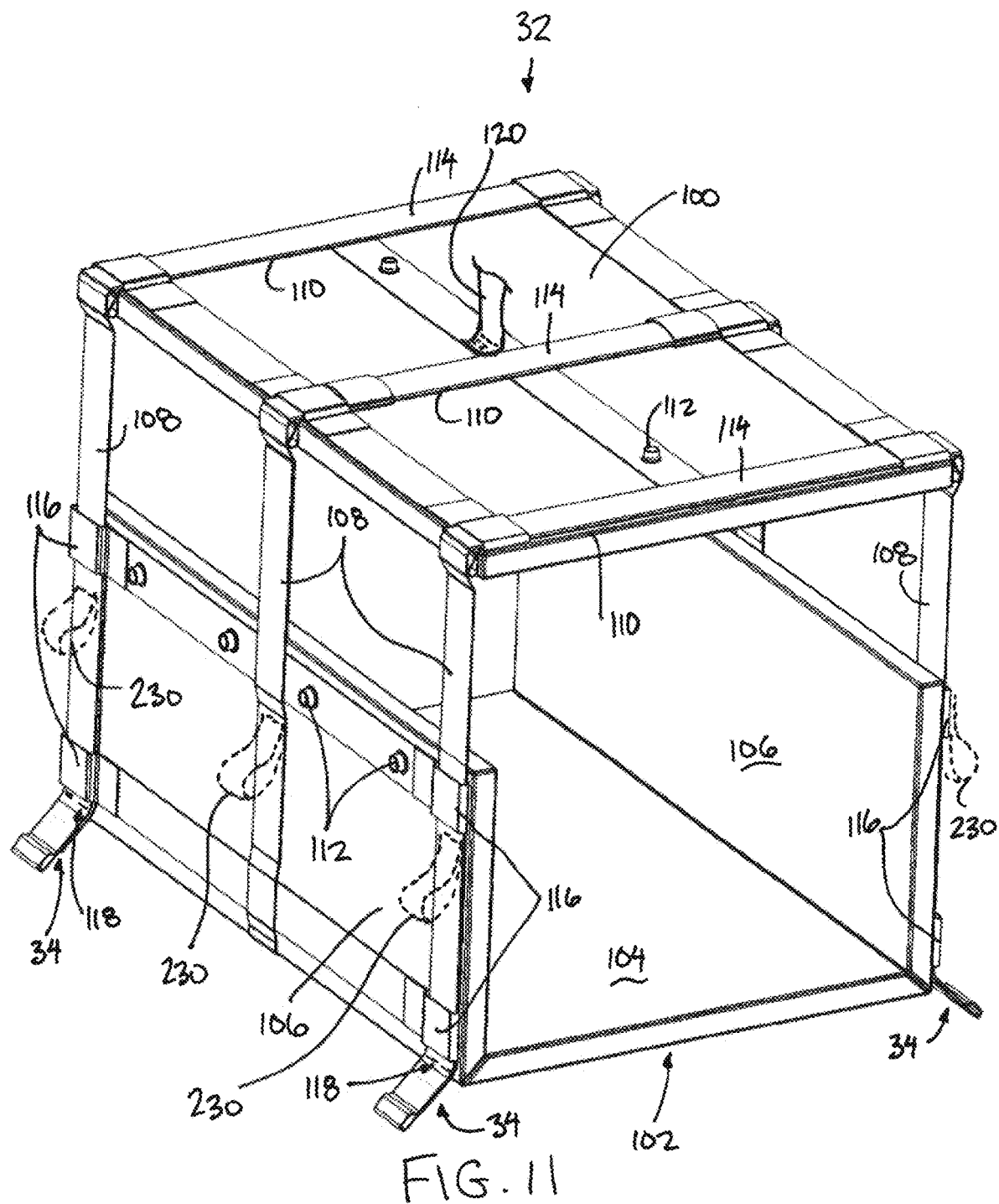
FIG. 11 is a perspective view of the inner lining shown separated from the outer crate in the working position according to either embodiment.
Figure 12:
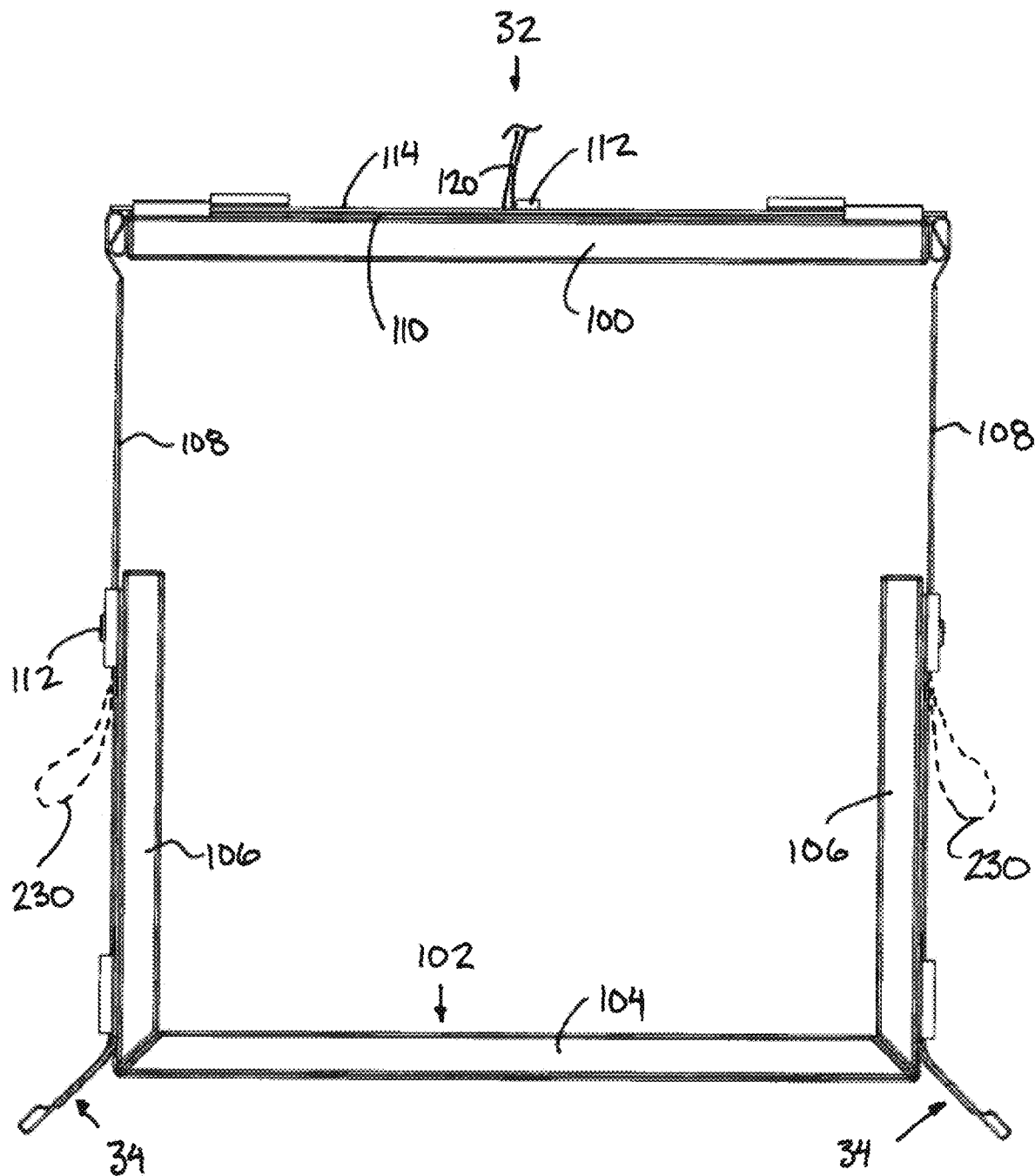
FIG. 12 is an end elevational view of the inner lining according to FIG. 11.
Figure 13:
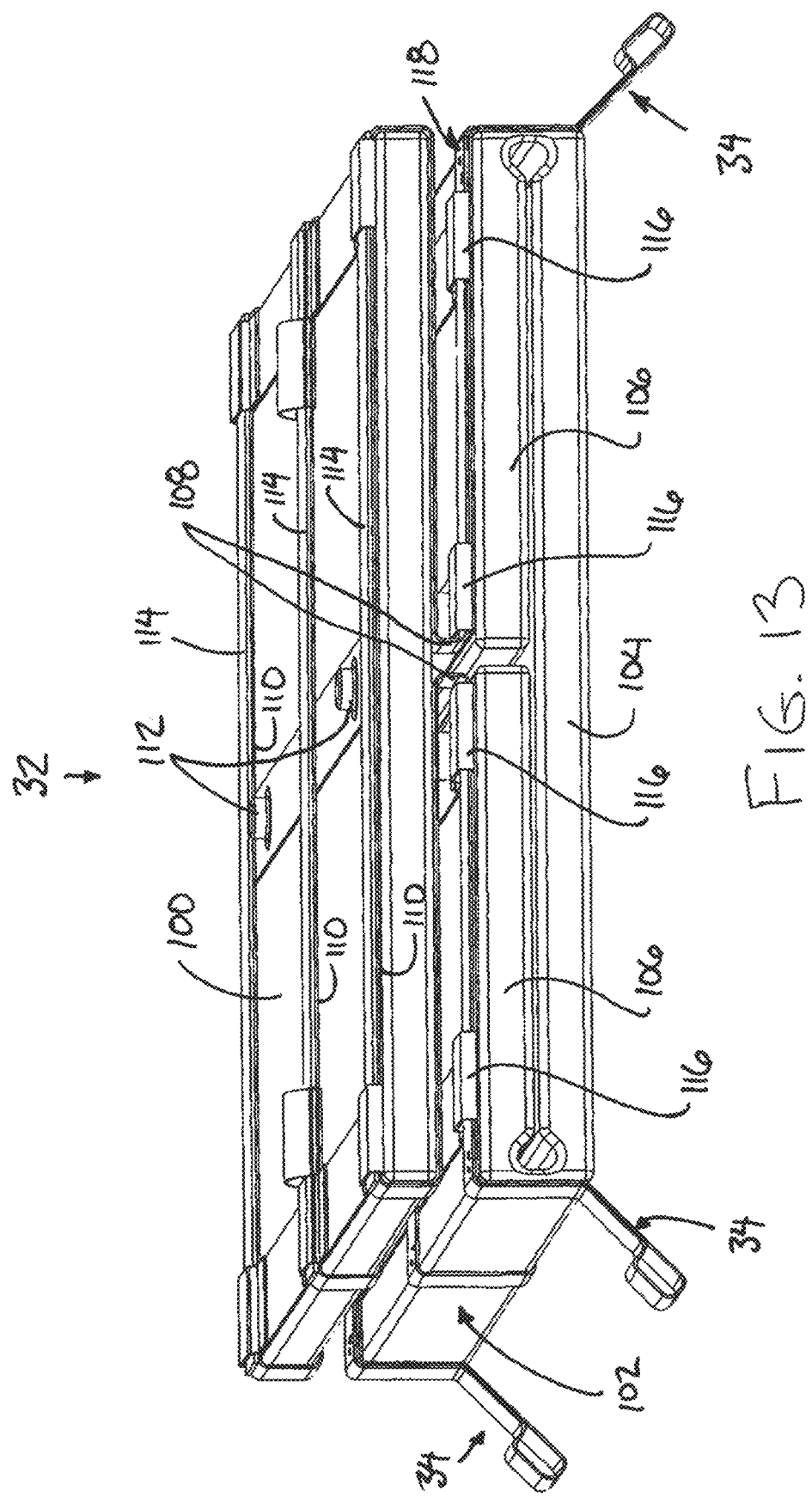
FIG. 13 is a perspective view of the inner lining shown separated from the outer crate in the collapsed position.
Figure 14:
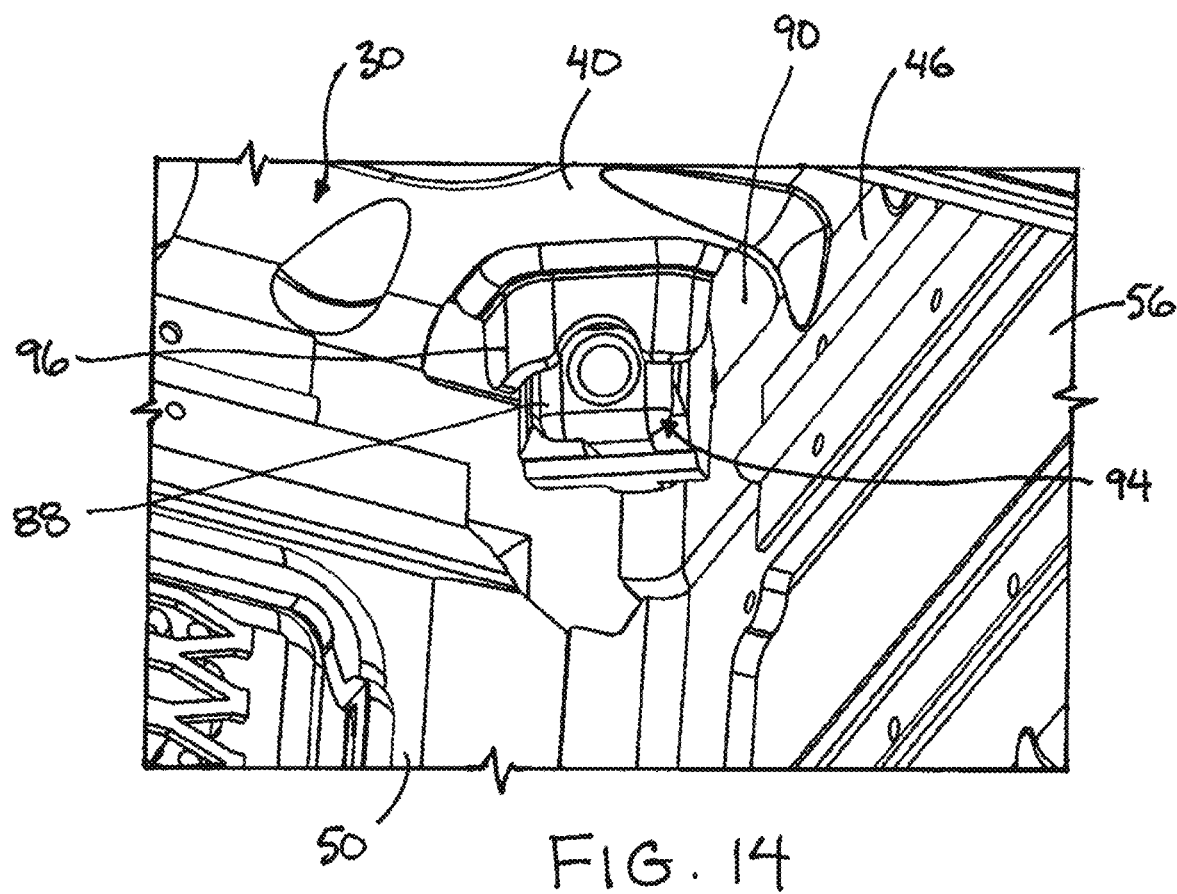
FIG. 14 is an inside view of the camera mounting arrangement for mounting a camera relative to the outer crate.
Figure 15:
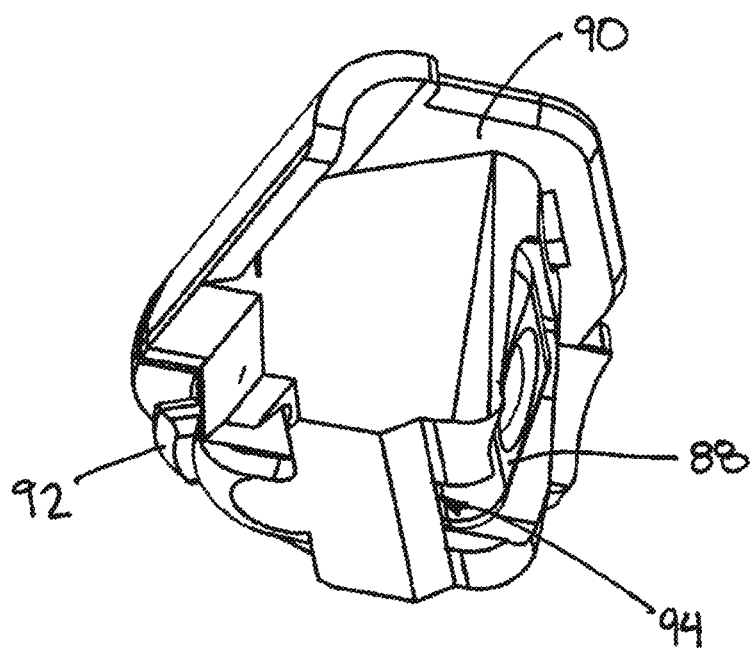
FIG. 15 is a perspective view of the camera mounting arrangement shown separated from the outer crate.

When the upper and lower panels of the inner lining are secured relative to corresponding wall panels of the outer crate, the side connecting straps 108 connected between the upper panel 100 and the lower panel 102 are provided with some additional slack therein to allow the side connecting straps to extend about the protruding flange 66 of the foldable walls of the outer crate in the collapsed position of FIG. 10. To take up the slack in the side connecting straps 108 in the working position, an elastic member 114 is provided across the top of each top strap 110 in connection between the top ends of the corresponding side connecting straps 108. The elastic member 114 is supported under tension to cause any slack in the side connecting straps to be gathered into one or more folds of material at the top end thereof as best shown in FIG. 12. As the outer crate is folded into the collapsed position, the inwardly protruding orientation of the protruding flanges 66 instead takes up the slack in the side connecting straps 108 by resiliently stretching and deforming the elastic member 114.

A lower portion of each side connecting strap 108 is connected to the corresponding side pad 106 of the inner lining by a pair of mounting loops 116 which are vertically spaced apart from one another along the respective side connecting strap in the working position. The mounting loops 116 are stitched in fixed relation to the lower panel 102 of the lining but receive the side connecting straps 108 therethrough respectively for relative sliding in the vertical direction of the working position.

To position the side connecting straps 108 with minimal slack in the working position, breakaway stitching 118 is provided between the side connecting straps 108 in the mounting loops or the lower panel 102 of the inner lining in proximity to the bottom of the outer crate. The breakaway stitching 118 secures the side connecting straps 108 in fixed relation to the lower panel 102. The breakaway stitching 118 is arranged to prevent breakage and thus prevent the release of the side connecting straps 108 for sliding relative to the lower panel 102 until a pulling force is provided on the side connecting straps which exceeds a prescribed holding force of the breakaway stitching.

Once the pulling force on the side connecting straps exceeds the prescribed holding force of the breakaway stitching, the stitching will break and separate to subsequently allow sliding movement of the side connecting straps 108 relative to the lower panel 102 of the lining. Pulling the side connecting straps 108 downwardly thus causes the upper panel 100 to be pulled downwardly towards the lower panel 102 to cause the flexible envelope formed by the inner lining to be circumferentially constricted about a longitudinal axis of the outer crate so that the inner lining can be constricted about an animal received therein by closing the gap between the upper panel 100 in the lower panel 102.

The pulling force on the side connecting straps 108 to constrict the envelope about an animal during a crash is accomplished by positioning the bottom ends of the side connecting straps 108 below the mounting loops 116 to communicate through the lower tether openings respectively. The portion of each side connecting strap 108 extending beyond the breakaway stitching 118 thus effectively defines a lower tether among the vehicle connecting tethers 34 which extends through the respective lower tether opening 36 in the outer crate to the exterior of the crate. Pulling the lower tether through the tether opening and outwardly in relation to the outer crate thus causes constricting of the inner lining about an animal contained within the outer crate.

The vehicle connecting tethers 34 also include an upper tether 120 which is fixed at a central location on the top side of the upper panel 100 of the inner lining such that the upper tether 120 extends through an upper tether opening of the tether openings 36 that is centrally located in the top side of the top panel 40 of the outer crate.

The apparatus 10 further includes a lower mounting arrangement comprised of two lower frame straps 122. Each lower frame straps includes a latch 124 at the rear end thereof to form a releasable mating connection with one of the frame anchors 20 at the rear of the lower seating surface 16 of the vehicle. The two lower frame straps 122 are thus arranged to extend forwardly in parallel relation to one another at laterally spaced apart locations in proximity to the opposing ends of the outer crate when the outer crate is positioned on the lower seating surface such that the longitudinal direction of the crate extends laterally across the seat in perpendicular relation to the forward working direction of the vehicle.

Each lower frame strap 122 further includes two connector plates 126 mounted at spaced positions along the lower frame strap for cooperation with two of the lower tethers respectively at one of the opposing ends of the crate. The lower tethers formed by the bottom ends of the side connecting straps 108 each include a mounting plate 128 mounted thereon. A slot formed in each mounting plate receives one of the connector plates 126 of the lower mounting arrangement therein in which the connector plate is oversized relative to the slot that the connector plate can only pass through in one prescribed orientation of the connector plate while restricting removal or passage of the connector plate through the mounting plate under normal pulling of the lower tether away from the lower frame straps 122 of the lower mounting arrangement. In this arrangement, in the event of a vehicular crash, in which forward momentum causes the apparatus 10 to be thrown forwardly from the passenger seat 14 upon which it is supported, the side connecting straps 108 remain fixedly connected to the lower frame straps 122 which are in turn fixed at rear ends relative to the vehicle frame to cause the connecting straps to be pulled outwardly from the outer crate to constrict the inner lining about the animal received therein.

Figure 2:
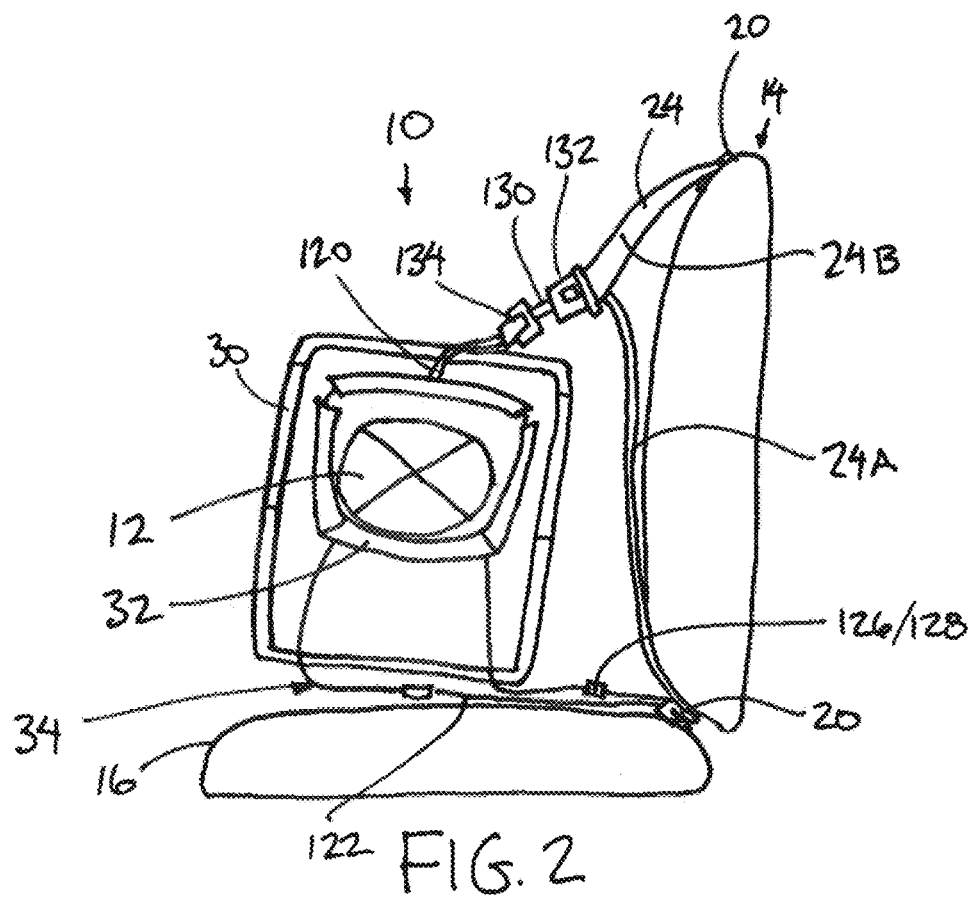
FIG. 2 is another end view of the apparatus displaced relative to the vehicle seat in response to a front end collision of the vehicle when an upper tether is connected to the apparatus, according to the first embodiment of FIG. 1.

An upper mounting arrangement is optionally provided as shown in FIG. 2. In this instance, an upper frame strap 130 includes a latching receptacle 132 formed at one end thereof to form a releasable connection with the seat belt buckle situated in proximity to the top end of the backrest 18 of the vehicle. A releasable connector 134 at the opposing end of the upper frame strap is arranged to form a releasable connection with a corresponding connector on the end of the upper tether 120 externally of the outer crate.

As shown in FIG. 2, when using the upper tether 120 in connection between the upper panel 100 of the inner lining and a corresponding frame anchor on the vehicle where the seatbelt is anchored, a front end collision of the vehicle resulting in forward momentum of the apparatus 10 relative to the vehicle causes a bottom end of the apparatus 10 to be displaced forwardly relative to the top end due to the anchoring of the top end relative to the vehicle by the upper tether 120. The forward movement of the bottom end of the outer crate together with the anchoring of the lower tethers using the lower mounting arrangement noted above causes the side connecting straps 108 to be pulled downwardly and outwardly through the respective lower tether openings in the bottom of the outer crate to constrict the inner lining about the animal received therein regardless of the condition of the crate which may remain intact or may be broken in pieces as a result of the vehicle crash.

Figure 3:
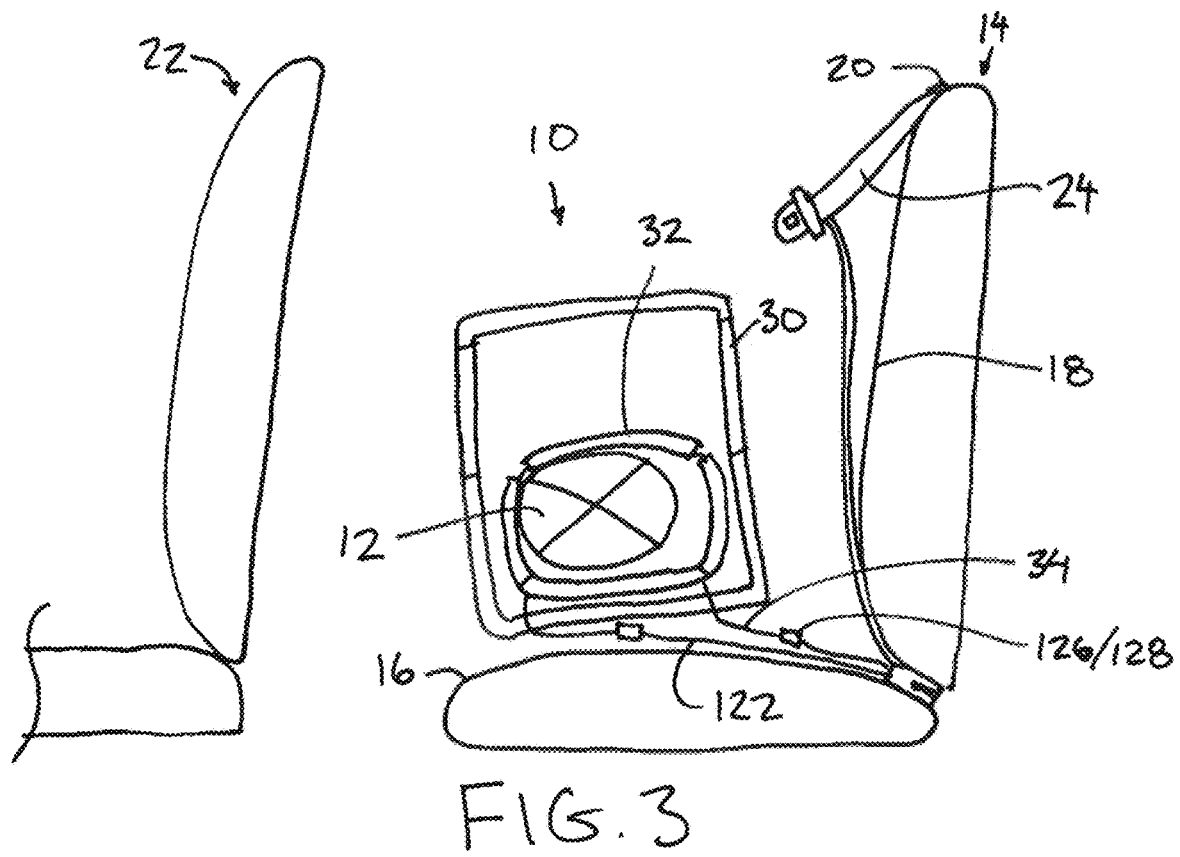
FIG. 3 is another end view of the apparatus displaced relative to the vehicle seat in response to a front end collision of the vehicle when the upper tether is not connected to the apparatus.
Figure 4:
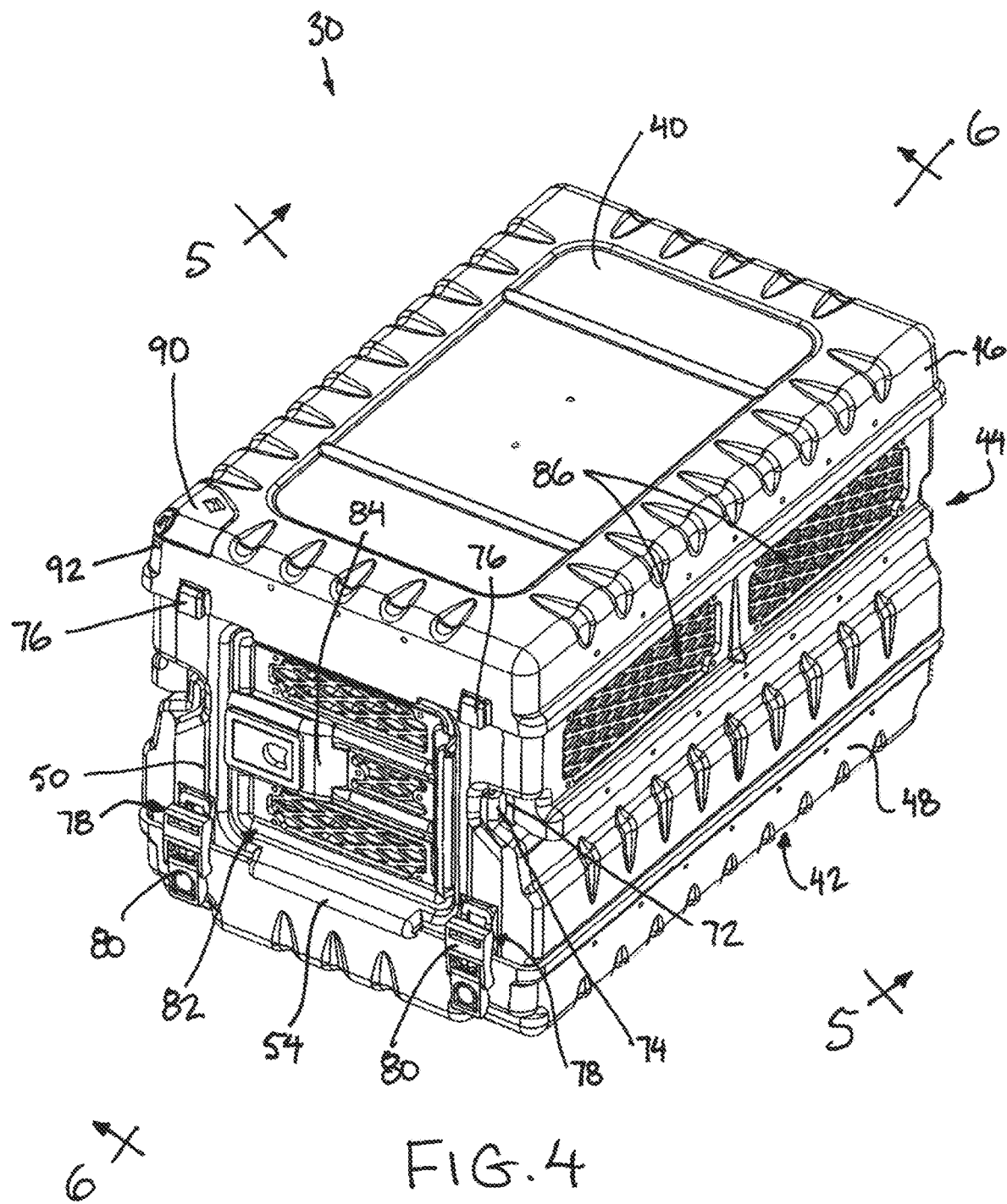
FIG. 4 is a perspective view of the outer crate of the apparatus in the working position, according to the first embodiment of FIG. 1.
Figure 5:
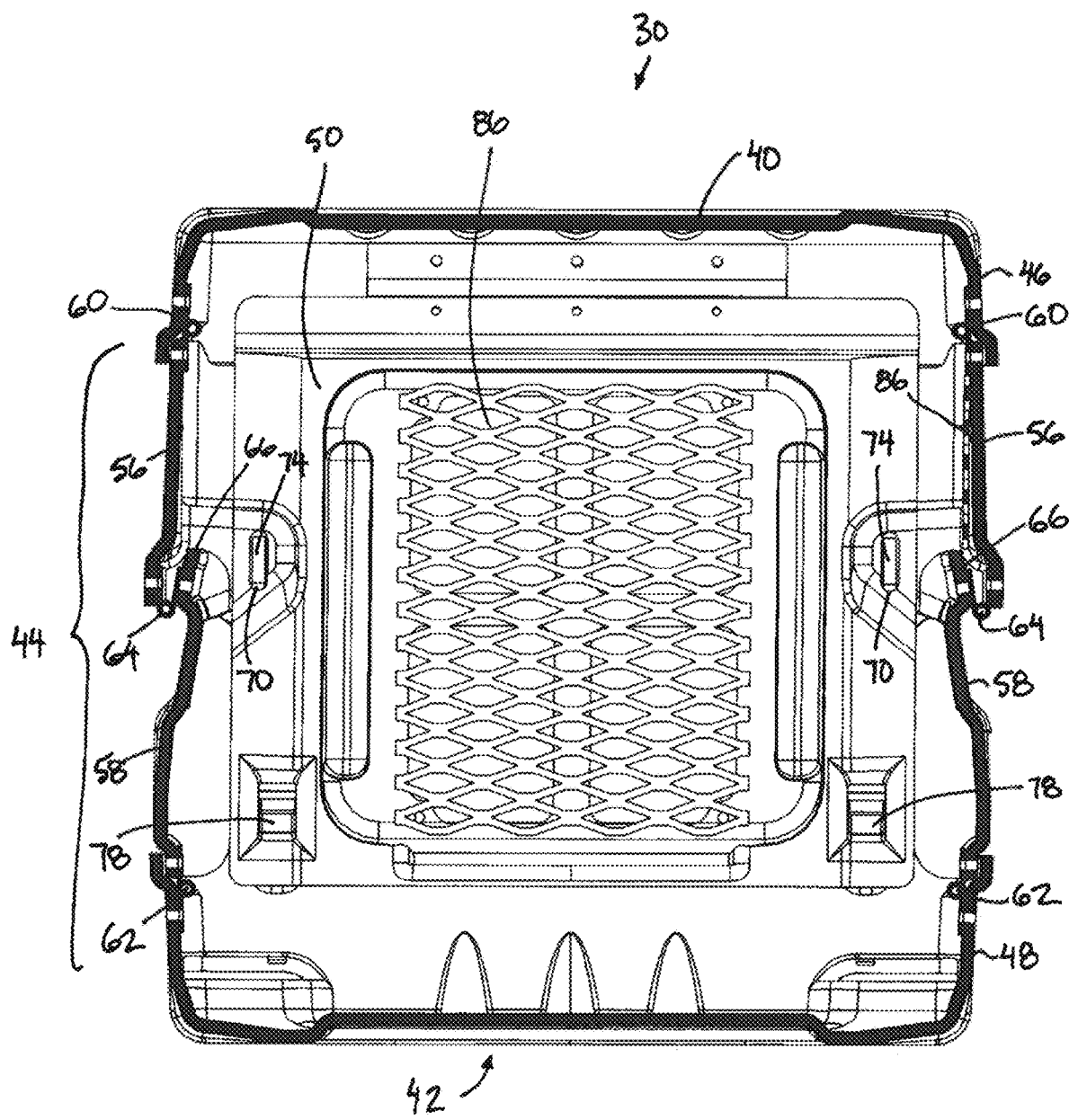
FIG. 5 is a sectional view along the line 5-5 in FIG. 4.
Figure 6:
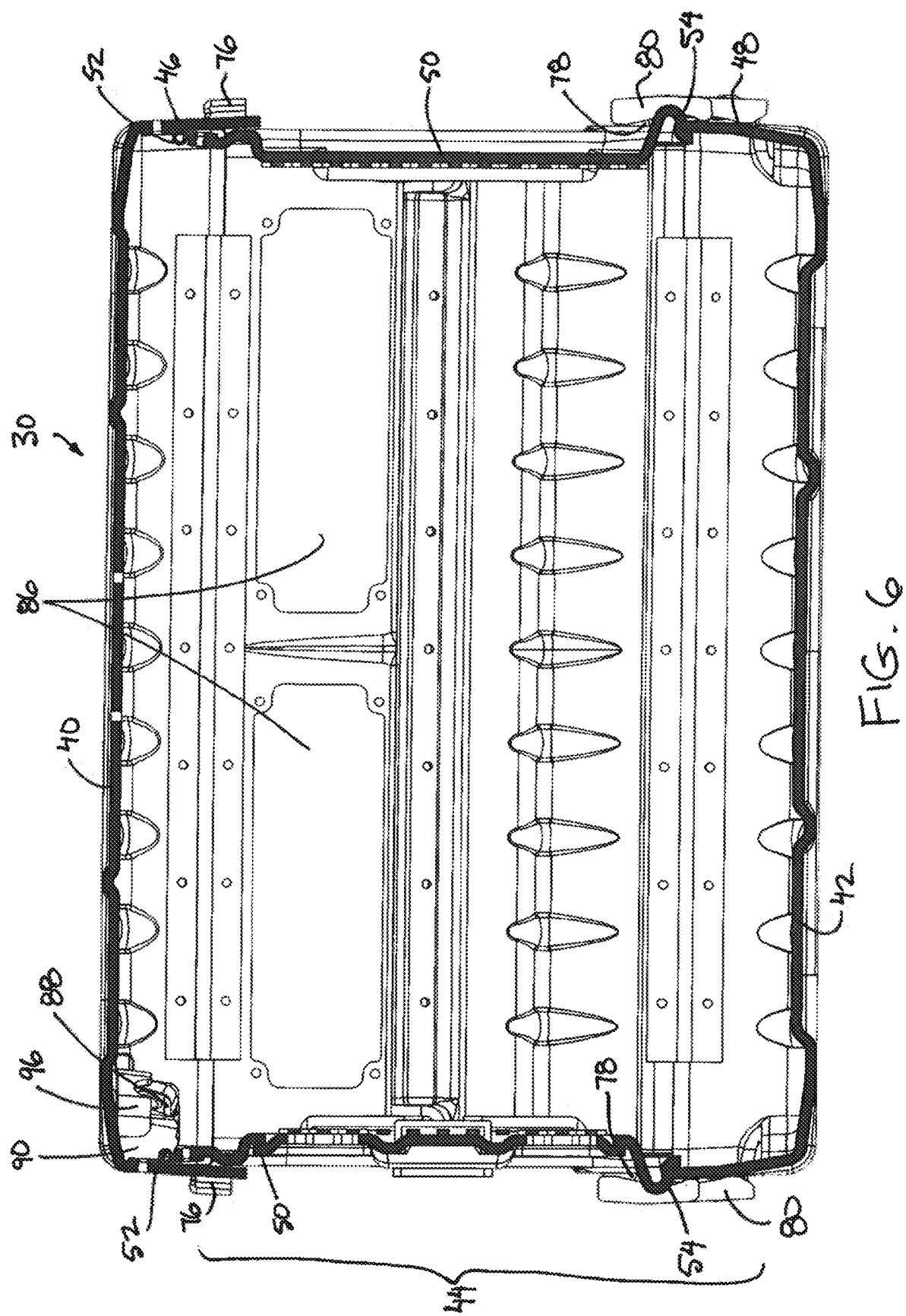
FIG. 6 is a sectional view along the line 6-6 in FIG. 4.
Figure 7:
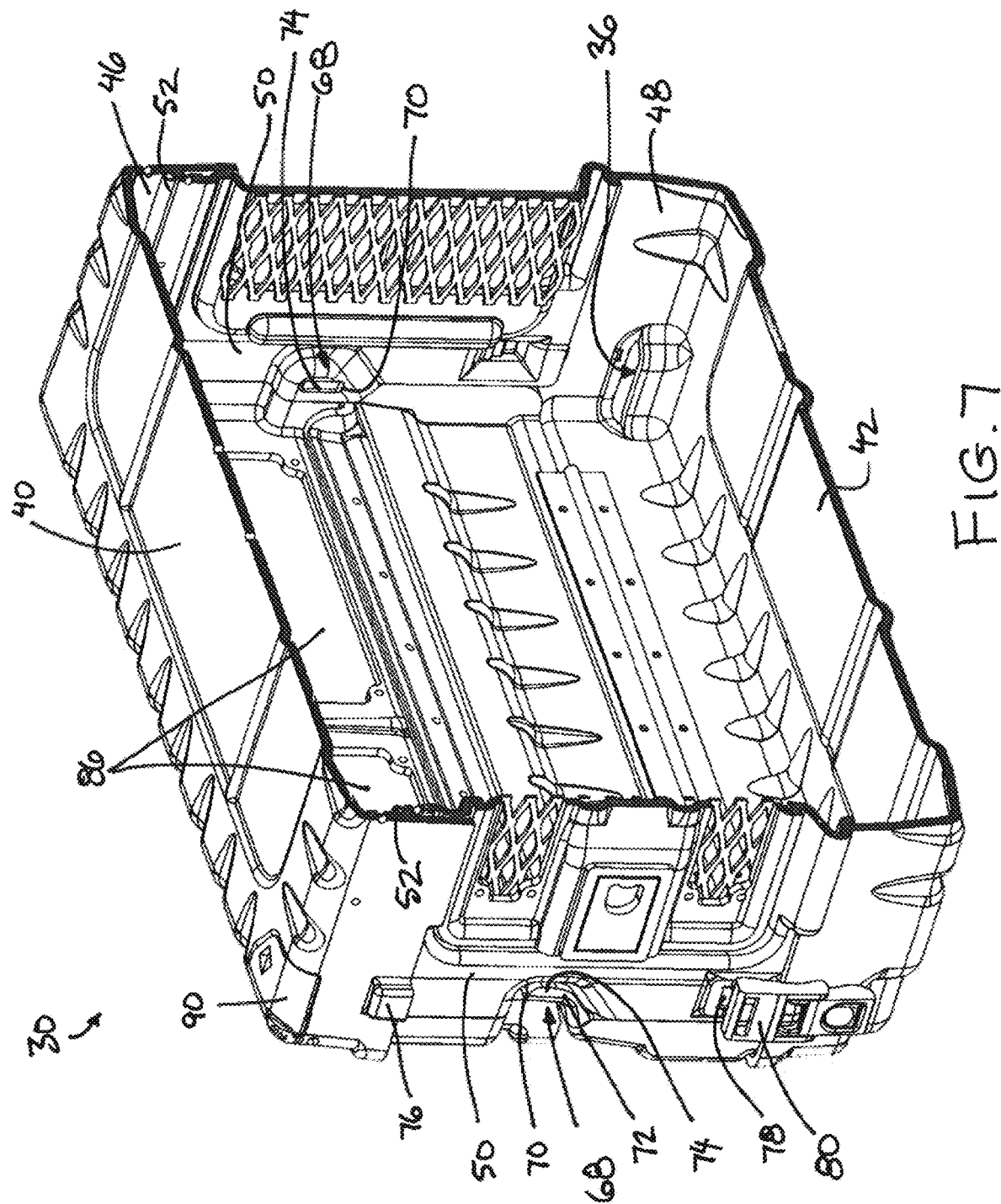
FIG. 7 is a perspective view of the cross-section of the outer crate according to FIG. 6.

Alternatively, as shown in FIG. 3, the apparatus 10 may also be used without an upper tether 120. In this instance, a front end collision of the vehicle resulting in forward momentum of the apparatus 10 relative to the vehicle may cause the top end of the apparatus 10 to be displaced forwardly to a greater extent than the bottom end due to the anchoring of only the lower tethers to the vehicle. In this instance however, even as the outer crate is displaced forwardly, the anchoring of the lower tethers using the lower mounting arrangement noted above again causes the side connecting straps 108 to be pulled downwardly and outwardly through the respective lower tether openings in the bottom of the outer crate to constrict the inner lining about the animal received therein regardless of the condition of the crate.

Turning now to the second illustrated embodiment of FIGS. 16 through 21, the apparatus 10 remains similar to the previous embodiment with regard to the use and configuration of the inner lining 32 arranged to be constricted about an animal by vehicle connecting tethers 34 while being contained within the outer crate 30 for ease of portability. The outer crate 30 according to the second embodiment is substantially identical to the previous embodiment with the exception of (i) the first and second mating connectors 68 and 70 on the lower side panels 58 and end panels 50 respectively, and (ii) the use of a latching arrangement formed of connectors 76, 78 and 80 according to the previous embodiment. The remaining features are substantially identical to the previous embodiment.

Figure 16:
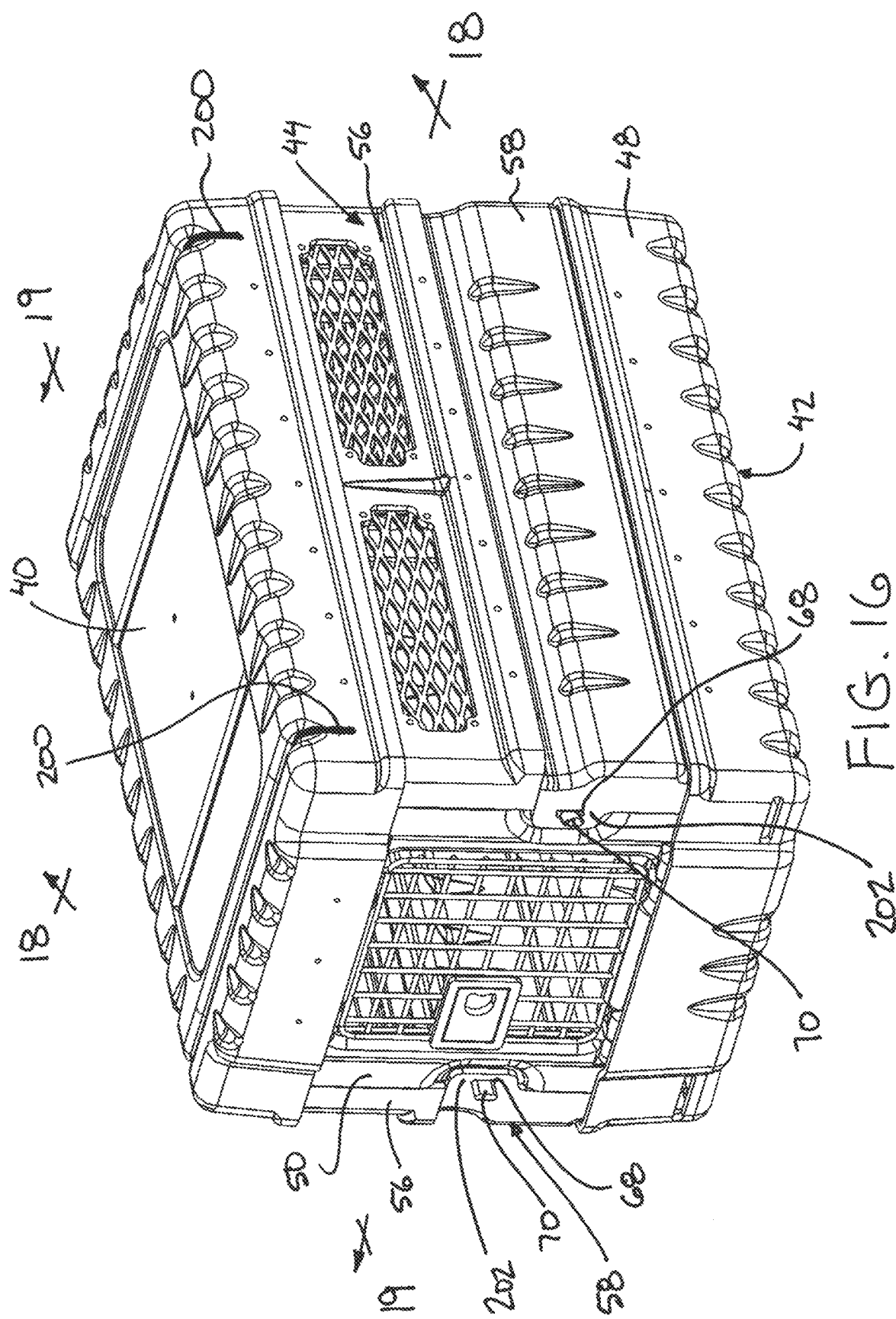
FIG. 16 is a perspective view of the outer crate of the apparatus in the working position, according to a second embodiment.
Figure 17:
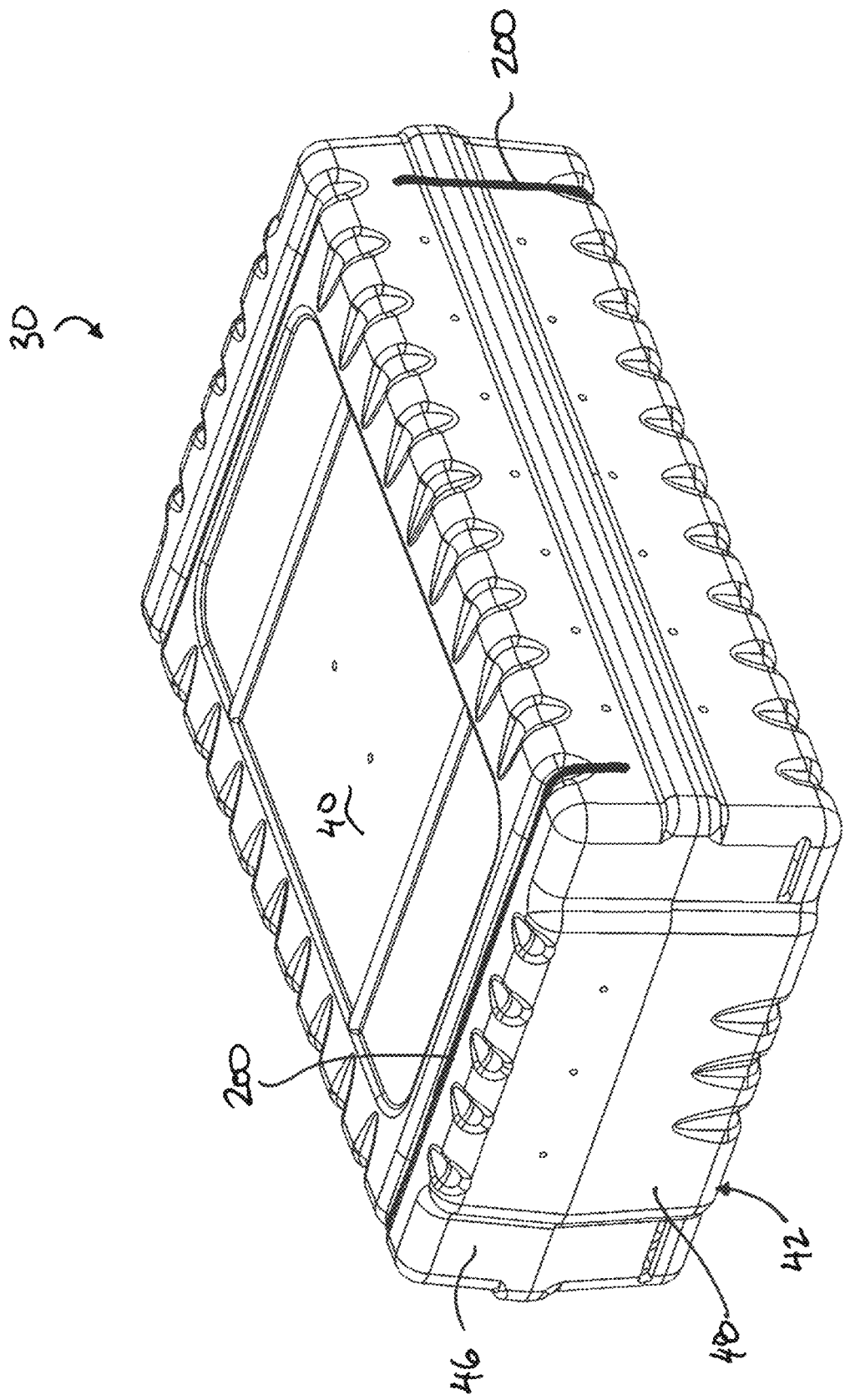
FIG. 17 is a perspective view of the outer crate of the apparatus in the collapsed position, according to the second embodiment of FIG. 16.
Figure 18:
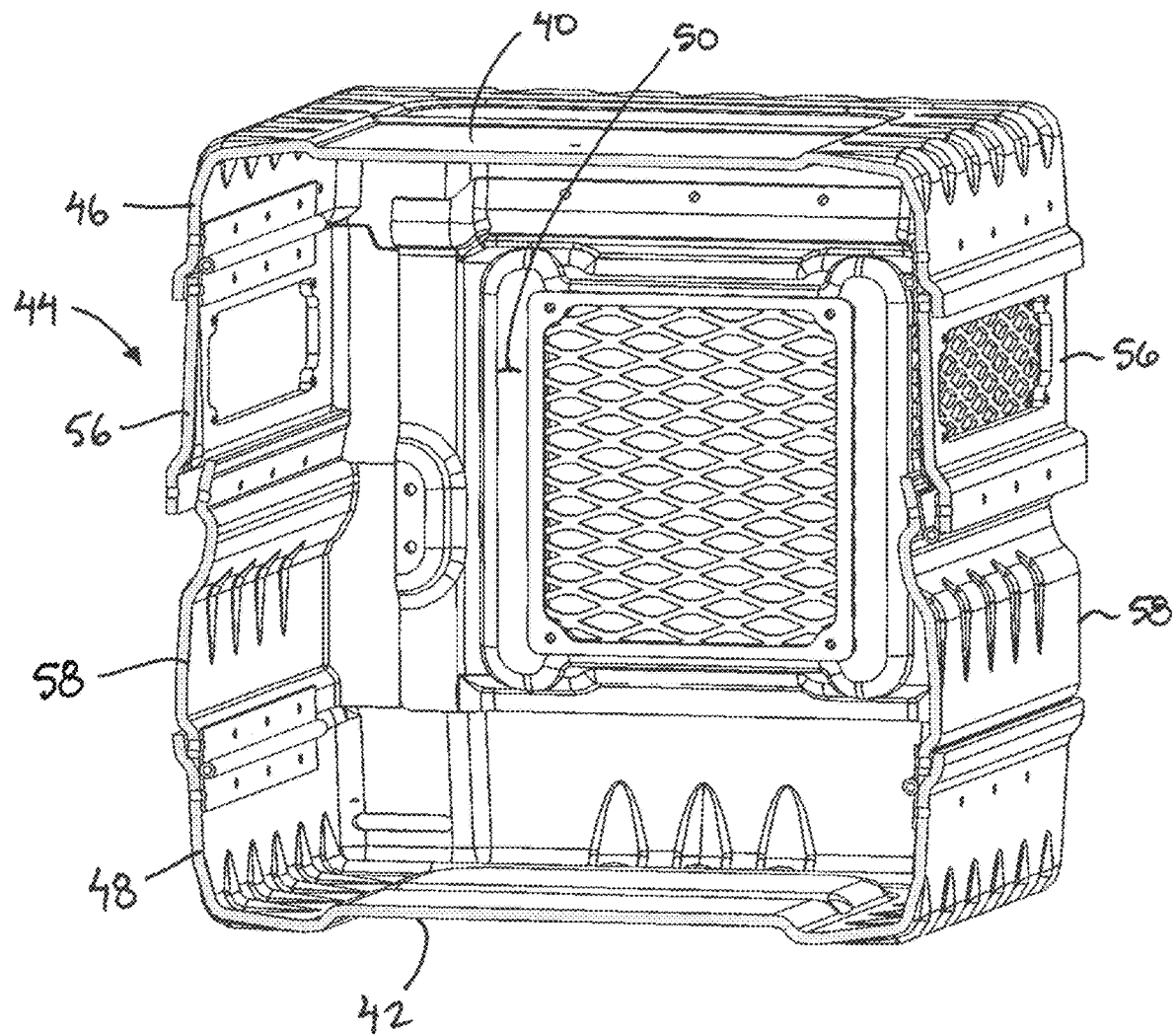
FIG. 18 is a sectional view along the line 18-18 in FIG. 16.
Figure 19:
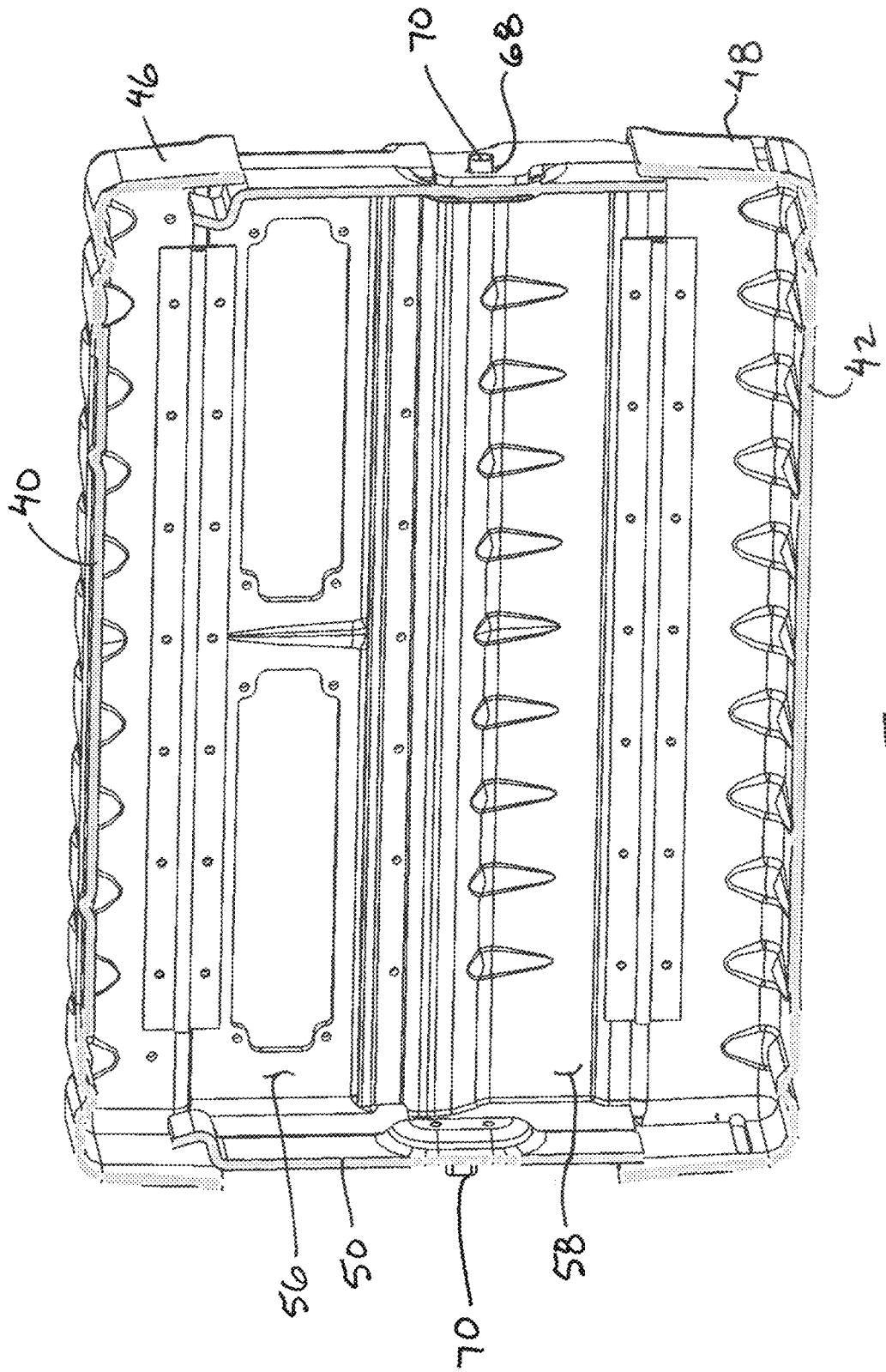
FIG. 19 is a sectional view along the line 19-19 in FIG. 16.

Accordingly, the outer crate 30 of the second embodiment again comprises a top panel 40 with a perimeter wall portion 46, a bottom panel 42 with a perimeter wall portion 48, side wall panels 44 formed of an upper panel 56 and a lower panel 58, and end panels 50 which are connected by a similar configuration of hinges for movement between a working position according to FIG. 16 and a collapsed position according to FIG. 17.

In the second embodiment, in order to retain the apparatus 10 in the collapsed position, a set of resilient bands 200 are supported on the outer crate 30 for movement between a first configuration and a second configuration respectively. The bands 20 collectively form a securing arrangement to selectively retain the outer crate in the collapsed position. More particularly, each resilient band 200 comprises an elongate elasticized cord which is fixedly mounted at opposing ends on laterally opposing edge portions of the perimeter wall portion 46 of the top panel 40. Two resilient bands 200 are provided in total in proximity to the opposing ends of the apparatus 10 respectively.

In the first configuration of each band 200, the band extends across an exterior of the top panel between the opposing ends so as not to obstruct displacement of the outer crate between the working position and the collapsed position. The length and resiliency of the band is configured such that the band remains under slight tension held snugly against the outer surface of the top panel between the opposing ends thereof. The bands 200 do not interfere with displacement of the outer crate between the collapsed position in the working position thereof when in the first configuration Each band 200 can be stretched and displaced into a second configuration when the outer crate is collapsed. In this instance, the band extends across an exterior of the bottom panel in a lateral direction across the full width of the panel while the opposing ends of the band remain anchored to the opposing edge portions of the perimeter wall of the top panel 40. The overall height of the perimeter wall portions of the top and bottom panels may be configured such that the path of the resilient band in the second configuration is longer than in the first configuration, thus requiring the band to be under greater tension in the second configuration. Due to the path of the band extending about the bottom panel while being anchored to the top panel in the second configuration, together with the increased tension in the band in the second configuration, the top and bottom panels are effectively retained by the bands in the collapsed position of the outer crate. In FIG. 16, both bands are stored in the first configuration. In FIG. 17, one of the bands has been displaced into the second configuration while the other band remains in the first configuration as the crate is being prepared for storage into the collapsed position.

According to the second embodiment of FIGS. 16 through 23, a first mating connector 68 is again provided at each end of each lower panel 58 however in this instance the first mating connector 68 comprises an aperture formed in an end panel portion 202 of the lower panel 58. The end panel portion 202 is a flat panel joined to the end of the lower panel 58 to lie parallel to the end panel 50 in the working position while overlapping a corresponding portion of the exterior of the end panel 50. In this instance, a second mating connector 70 is again provided on each of the laterally opposing sides of each end panel 50. The second mating connectors 70 in this instance comprise protruding tabs mounted on the end panel to protrude outwardly through the aperture formed by the corresponding first mating connector 68 of the outer crate.

Similarly to the previous embodiment, the mating first and second connectors 68 and 70 are located at the intermediate height near the top end of the lower side panels 58 so as to be approximately centred between the top and bottom of the outer crate while providing support at laterally opposing sides of each end panel. Also similarly to the previous embodiment, each second mating connector 70 mates with a corresponding first mating connector 68 as the corresponding end panel is pivoted into the working position thereof, resulting in the connectors mating with one another by a longitudinal sliding connection along a respective axis oriented in the longitudinal direction of the outer crate. Once each second mating connector 70 has been inserted into a corresponding first mating connector 68, support is provided between the end panels 50 and the wall panels 48 of the outer crate to resist the upper and lower panels 56 and 58 of each wall panel 44 from pivoting outward or inward towards the collapsed position as described above in regard to the previous embodiment.

In the second embodiment, additional support is provided when the second mating connectors 70 are further operable between an unlocked state and a locked state thereof so that the previously described latches 76, 78 and 80 are no longer required. In this instance, each second mating connector 70 is supported on the end panel 50 to be rotatable about a longitudinal axis of the connector corresponding to the longitudinal sliding axis along which the second mating connector 70 is slid into the corresponding first mating connector 68. Each second mating connector 70 is further arranged to be elongated along a respective diametrical axis while being shaped to be received within a corresponding elongated shape of the respective aperture forming the corresponding first mating connector 68. The elongated shape of the mating connector 70 aligns with the elongated shape of the aperture of the first mating connector 68 in the unlocked state thereof so as to enable the end panel 50 to be displaced between collapsed and working positions without restriction by the mating connectors.

Once each end panel is positioned in the working position and the second mating connector 70 supported thereon is inserted through the first mating connector 68 to be located at an exterior of the crate, an end portion of the protruding tab forming the second mating connector 70 can be rotated from the unlocked state to the locked state through a range of approximately 90 degrees about the longitudinal axis of the connector such that the elongated shape of the second mating connector 70 no longer aligns with the direction of the elongated shape of the aperture. While remaining in this locked state, the end panels can no longer be pivoted inwardly towards the collapsed position thereof so as to remain in a supporting position relative to the wall panels 44 and thereby also prevent the wall panels from pivoting inward towards the collapsed position.

As a result of the support provided by the locked condition of the second mating connectors 70, the second embodiment further differs from the previous embodiment in that no additional hooking portion 54 is required along the bottom of each end panel 50 for additional support to retain the end panel in the working position.

With reference to FIG. 3, either of the embodiments of the apparatus 10 described above may rely only on lower tethers among the vehicle connecting tethers 34 described above, such that the lower mounting arrangement comprises two lower frame straps 122 with a latch 124 to form a releasable mating connection with the frame anchors 20 at the rear of the lower seating surface of the vehicle.

Alternatively, either one of the embodiments of the apparatus described above may rely on a combination of lower frame straps 122 and an upper tether 120 in which the upper tether 120 is secured using an upper mounting arrangement comprised of an upper frame strap 130 including a latching receptacle 132 to form a releasable connection with the seat belt buckle of the vehicle as shown in FIGS. 1 and 2.

Figure 22:
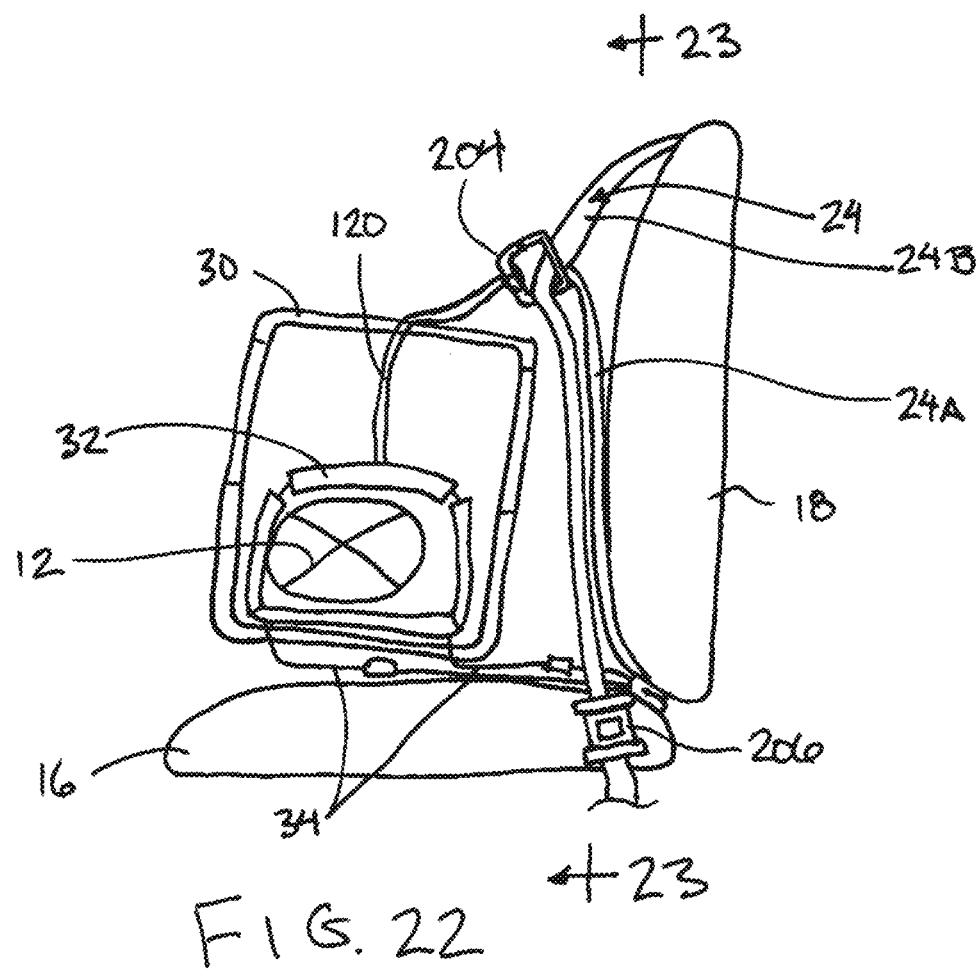
FIG. 22 is an end view of the apparatus supported on a vehicle seat according to a further embodiment of the upper tether.
Figure 23:
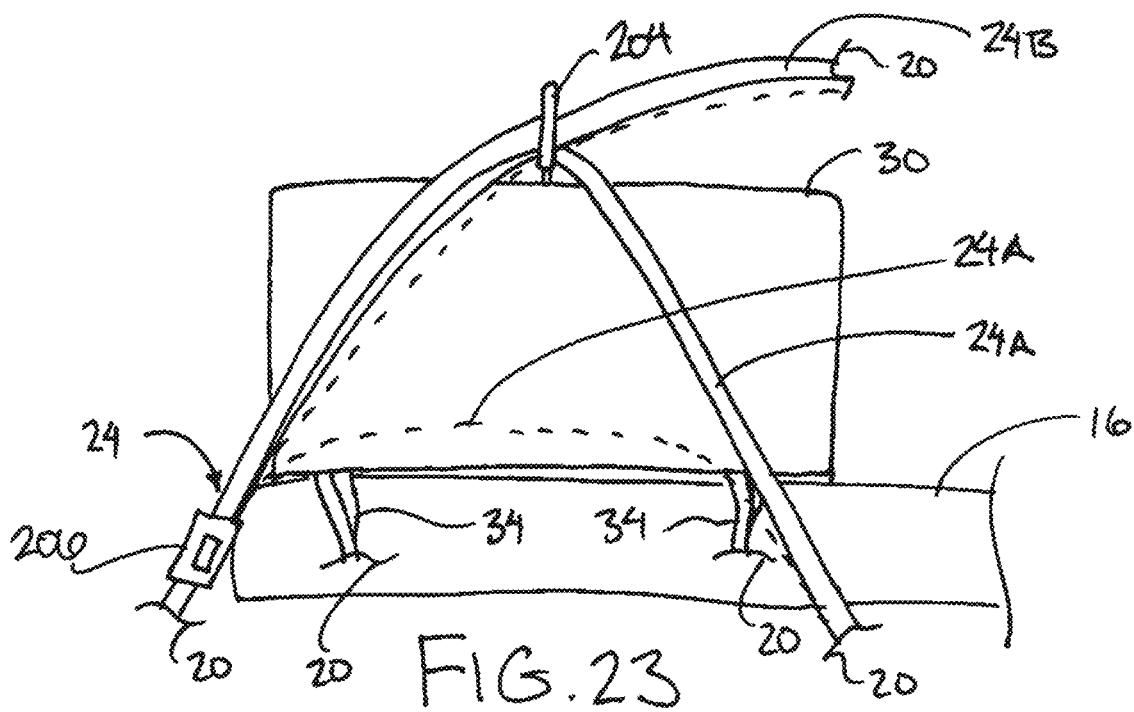
FIG. 23 is a rear elevational view of the apparatus along the line 23-23 in FIG. 22.

In yet a further arrangement, either one of the embodiments of the apparatus described above may rely on a combination of lower frame straps 122 and an upper tether 120 in which the upper tether 120 is secured using an upper mounting arrangement according to FIGS. 22 and 23. In this instance, the upper tether 120 may include a rigid anchor loop 204 connected at the outer end thereof to form a connection with the seatbelt 24 of the vehicle. The rigid anchor loop 204 may be a closed ring requiring the seatbelt to be threaded through the ring according to the placement of the shoulder belt portion 24B and the waist belt portion 24A as shown in solid line in FIGS. 22 and 23. In this instance, both the shoulder belt portion and the waist belt portion are threaded through the rigid anchor loop 204 and connected to a common seatbelt latch 206 of the vehicle. The belt portions 24A and 24B and the seatbelt latch 206 are in turn anchored relative to respective vehicle anchors 20 of the vehicle.

Alternatively, when the rigid anchor loop 204 is C-shaped with a gap therein or is formed of a ring which can be opened or closed such as a carabiner, only the shoulder belt portion 24B may be threaded through the rigid anchor loop 204 while the waist belt portion 24A merely passes along the lower seating surface 16 so that both the shoulder belt portion and the waist belt portion are connected to the common seatbelt latch 206 of the vehicle in the usual manner. The path of the shoulder belt portion 24B and the waist belt portion 24A according to this arrangement are represented in broken line in FIG. 23. In each instance, the upper tether 120 connected to the inner lining 32 by passing through a top opening in the outer crate 30 remains connected to respective vehicle anchors 20 through the seatbelt 24 in addition to the anchoring to the vehicle using the lower latch and the lower frame straps 122.

In yet a further arrangement, lower tethers among the vehicle connecting tethers 34 may be anchored to the waist belt portion 24A when the waist belt portion is arranged to pass along the lower seating surface 16 between vehicle frame anchoring locations 20 in the manner shown in broken line in FIG. 23.

Figure 24:
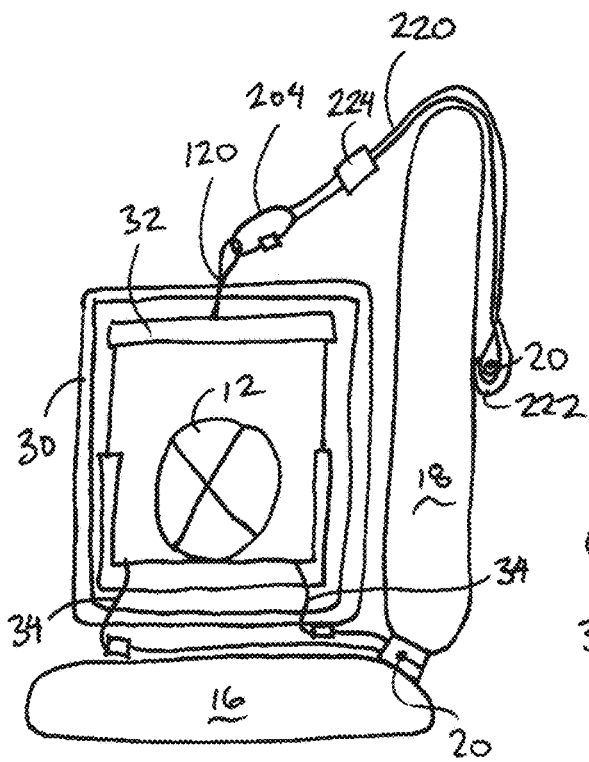
FIG. 24 is an end view of the apparatus supported on a vehicle seat according to a further embodiment of the upper tether.
Figure 25:
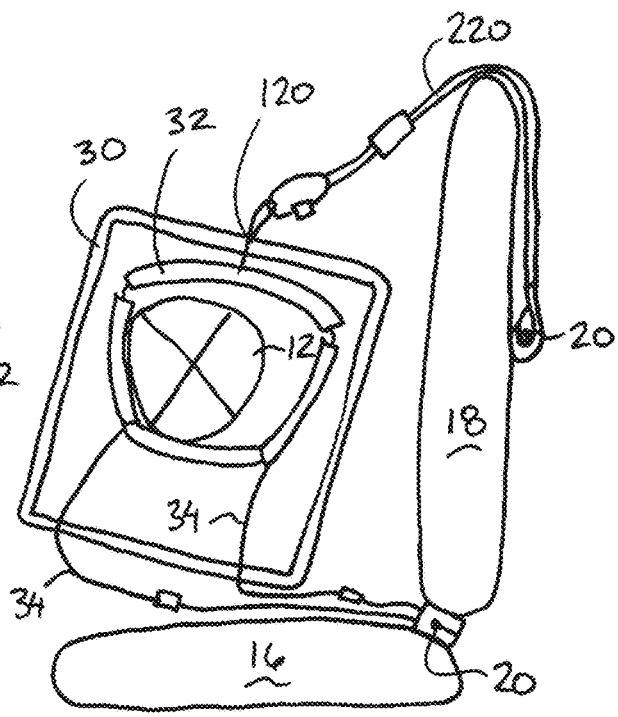
FIG. 25 is an end view of the apparatus according to the embodiment of FIG. 24, during a front-end collision of the vehicle.
Figure 26:
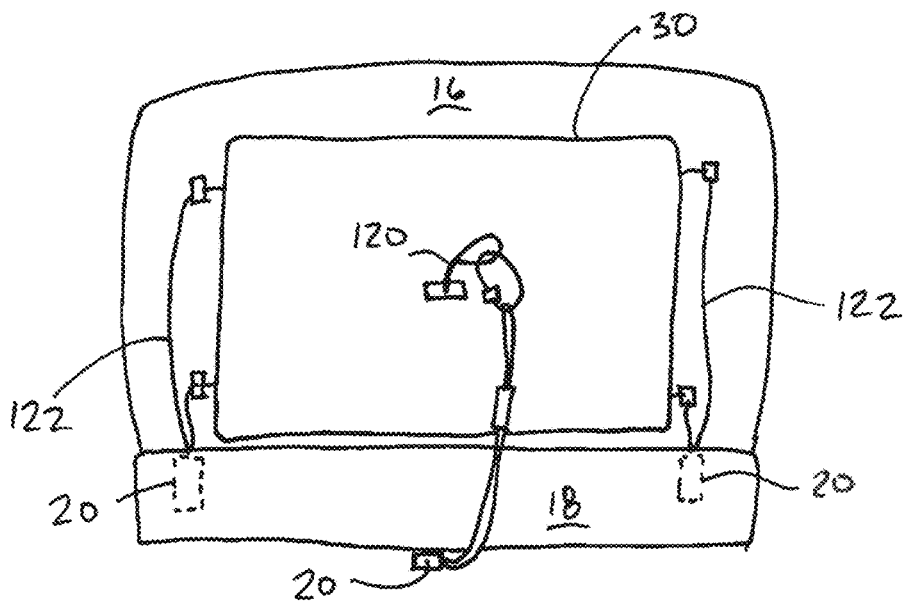
FIG. 26 is a top plan view of the apparatus according to the embodiment of FIG. 24.

Turning now to FIGS. 24 through 26, in this instance, a lower mounting arrangement is again comprised of tethering straps 122 connected to lower anchors 20 of the vehicle; however, the upper tether 120 in this instance is instead connected to an upper frame anchor 20 of the vehicle normally used for forming the third or upper child seat anchor in a vehicle. In some instances, the upper frame anchor may be found at the rear of the seat back 18, or alternatively on the roof of the vehicle. The upper tether 120 is a fabric loop threaded through an opening in the top of the outer crate 30 while being connected at the inner end to the top of the inner lining 32. A rigid loop 204 similar to the structure disclosed in FIG. 22 is used for connection to an upper tethering strap 220 having a hook 222 at the opposing end thereof for securement to the upper frame anchor 20. A slack tightener 224 is connected in line with the strap for removing any slack in the strap. The upper tethering strap 220 provides the same function as the connection to a vehicle seatbelt according to FIG. 2. During a collision, forward travel of the bottom end of the crate causes the breakaway straps of the inner lining 32 to be engaged so that the lower vehicle anchoring tethers 34 are drawn outwardly from the outer crate 30 as shown in FIG. 25, thus causing the bottom of the inner liner 32 to move upwards towards the top of the crate for constricting about the animal 12 while the bottom of the crate swings forwardly. The top tethering strap 220 is fixed in length and is more centred relative to the outer crate, as compared to the seatbelt anchoring of FIG. 2, to reduce lateral and torsional motion of the crate.

According to a further arrangement shown in FIGS. 27 and 28, upper and lower mounting arrangements are provided similarly to the previous embodiments for connection to the two lower frame anchors 20 and one upper frame anchor 20 on the vehicle; however, in this instance the seatbelt 24 of the vehicle is used in addition to the top tethering strap 220 and the lower tethering straps 122 to provide additional securement relative to the vehicle. In this instance, a plurality of side straps 230 are provided on the inner lining 32 to be threaded through corresponding tether openings along the side walls of the outer crate. The location of the side straps 230 on the inner lining 32 are shown in broken line in FIGS. 11 and 12. A seatbelt extension 240 is provided in the form of an elongate strap having a female seatbelt connector 242 mounted at a first end thereof and a male seatbelt connector 244 at the second end thereof. The female seatbelt connector 242 is a receptacle that mates with the male end 246 of the existing seatbelt 24 of the vehicle. The male seatbelt connector 244 defines a protrusion that is arranged to mate with the existing female seatbelt receptacle 206 of the vehicle. The seatbelt extension strap is threaded through the loops formed at the outer ends of each side strap 230 along one side of the outer crate 30 opposite from the seatback 18. More particularly, when a first side of the outer crate is positioned against the seat back 18, the seatbelt extension 240 extends across the opposing second side of the outer crate so that the outer crate is received between the seat back 18 and the seatbelt extension 240. The use of a seatbelt extension further restrains motion of the outer crate relative to the vehicle if required.

Alternatively, the shoulder strap portion 24B of the seatbelt may itself extend about the outer crate and be threaded through a loop formed at the outer end of each side straps 230 prior to being secured within the seatbelt receptacle 206 secured to a respective frame anchor 20 on the vehicle. The upper end of the shoulder belt 24B is similarly secured relative to a respective frame anchor 20 of the vehicle. In some embodiments, a rigid loop that can be opened and closed is mounted onto the loop at the outer end of each side strap 230 such that the shoulder belt portion 24B of the seatbelt can be more readily connected to each of the side straps 230 by being threaded into each of the rigid loops of the side straps 230 respectively. In this instance, when a first side of the outer crate 30 is positioned against the seat back 18, the shoulder belt portion 24B of the seatbelt extends across the opposing second side of the outer crate 30 so that the outer crate is received between the seat back 18 and the shoulder belt portion 24B in a mounted position.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An animal transport crate apparatus for transporting an animal within a vehicle having frame anchors, the apparatus comprising:
   an outer crate including rigid panels forming an outer boundary of an animal enclosure;
   an inner lining received within the outer crate, the inner lining defining a flexible envelope arranged to receive the animal therein within the outer crate; and
   at least one vehicle connecting tether extending through a respective tether opening in the outer crate, said at least one vehicle connecting tether being arranged to be connected between the inner lining and the frame anchors of the vehicle;
   wherein the flexible envelope is arranged to be constricted about the animal therein responsive to said at least one vehicle connecting tether being pulled outwardly relative to the outer crate.

2. The apparatus according to claim 1 wherein said at least one vehicle connecting tether includes one or more lower tethers extending through the respective tether opening in proximity to a bottom of the outer crate.

3. The apparatus according to claim 1 wherein said at least one vehicle connecting tether includes a lower tether extending through the respective tether opening in proximity to a bottom of the outer crate and an upper tether extending through the respective tether opening in proximity to a top of the outer crate.

4. The apparatus according to claim 1 further comprising a breakaway element connecting a portion of said at least one vehicle connecting tether to the inner lining so as to prevent constricting of the flexible envelope, the breakaway element being arranged to be separated in response to a pulling force on said at least on vehicle tether that exceeds a prescribed holding force of the breakaway element such that the inner lining is only arranged to be constricted in response to the pulling force on said at least one vehicle connecting tether exceeding said prescribed holding force.

5. The apparatus according to claim 1 wherein the flexible envelope includes an upper panel adjacent a top of the outer crate and a lower panel adjacent a bottom of the outer crate separated by a gap in a normal mounted position within the outer crate, the upper panel and the lower panel being arranged to be drawn together as the flexible envelope is constricted by said at least one vehicle connecting tether.

6. The apparatus according to claim 5 wherein the gap between the upper panel and the lower panel of the flexible envelope is aligned with a window opening in the outer crate in the normal mounted position.

7. The apparatus according to claim 1 further comprising:
   said at least one vehicle connecting tether including a plurality of lower tethers extending through the respective tether openings in proximity to a bottom of the outer crate and an upper tether extending through the respective tether opening in proximity to a top of the outer crate;
   a lower mounting arrangement connected to the lower tethers, the lower mounting arrangement being arranged to be connected to a pair of lower seat anchors on the vehicle frame in proximity to a lower seating surface on the vehicle; and
   an upper mounting arrangement connected to the upper tether, the upper mounting arrangement being arranged to be connected to a mounting location on the vehicle at a location spaced above the lower seating surface on the vehicle.

8. The apparatus according to claim 1 further comprising:
   said at least one vehicle connecting tether including a plurality of lower tethers extending through the respective tether openings in proximity to a bottom of the outer crate;
   a lower mounting arrangement arranged to be connected to a pair of lower seat anchors on the vehicle frame in proximity to a lower seating surface on the vehicle;
   the lower tethers being connected to the lower mounting arrangement so as to be readily releasable therefrom for removing the apparatus from the vehicle.

9. The apparatus according to claim 1 wherein the outer crate is generally rectangular in shape so as to have four bottom corners, said at least one vehicle connecting tether including four lower tethers extending through the respective tether openings in proximity to the four bottom corners of the outer crate respectively.

10. The apparatus according to claim 1 wherein the inner lining is secured to an inner surface of the outer crate using a plurality of releasable mating connectors.

11. The apparatus according to claim 1 further comprising:
   the outer crate being elongate in a longitudinal direction between opposing ends of the outer crate;
   a door mounted on one of the ends of the outer crate so as to be pivotal between open and closed positions relative to a door opening at the end of the outer crate;
   the inner lining being generally tubular in shape about a longitudinal axis of the inner lining in alignment with the longitudinal direction of the crate so as to define an opening in the flexible envelope in alignment with the door opening in the outer crate.

12. The apparatus according to claim 11 wherein said at least one vehicle connecting tether includes two lower tethers extending through the respective tether openings in proximity to a bottom of the outer crate, the two lower tethers being at spaced apart positions relative to one another in the longitudinal direction of the outer crate so as to be arranged to support the outer crate such that the longitudinal direction extends transversely to a forward working direction of the vehicle.

13. The apparatus according to claim 1 wherein the rigid panels of the outer crate comprise a top panel, a bottom panel, and a plurality of wall panels pivotally coupled between the top panel and the bottom panel such that the outer crate is collapsible from (i) a working position in which the top panel is spaced above the bottom panel to define the animal enclosure arranged to receive the animal therein to (ii) a collapsed position in which the top panel is adjacent to the bottom panel such that the outer crate is reduced in height relative to the working position.

14. The apparatus according to claim 13 wherein the wall panels comprise:
   two end panels at longitudinally opposing ends of the outer crate, each end panel being hinged onto one of the top panel or the bottom panel for pivotal movement between the working position and the collapsed position;
   two upper side panels hinged onto the top panel at opposing sides of the outer crate respectively; and
   two lower side panels hinged onto the bottom panel at the opposing sides of the outer crate respectively, the lower side panels being hinged onto the two upper side panels respectively such that the lower side panels and the upper side panels are folded inwardly against one another in the collapsed position relative to the working position.

15. The apparatus according to claim 14 wherein the upper side panels and the lower side panels define a foldable wall at each of the opposing sides of the outer crate in which each foldable wall comprises one of the upper side panels and a corresponding one of the lower side panels connected thereto for relative pivotal movement about a folding axis of the foldable wall, and wherein a first one of the side panels of each foldable wall protrudes beyond the folding axis in overlapping arrangement against an inner surface of a second one of the side panels of that foldable wall so as to prevent outward movement of the foldable wall beyond the working position.

16. The apparatus according to claim 14 wherein one of the side panels at each side of the outer crate comprises a first mating connector formed thereon and wherein each of the end panels comprises a second mating connector formed thereon, each first mating connector being arranged to mate with a respective one of the second mating connectors for relative sliding movement in the longitudinal direction as the end panel that supports the first mating connector thereon is pivoted into the working position relative to the side panels in the working position, whereby mating of the first mating connectors with the second mating connectors prevents displacement of the side panels from the working position to the collapsed position, wherein one mating connector of the first and second mating connectors is operable from an unlocked state allowing relative sliding movement between the mating connectors to release the end panel from the working position to the collapsed position to a locked state preventing relative sliding movement between the mating connectors to retain the end panel in the working position.

17. The apparatus according to claim 13 further comprising a securing arrangement arranged to secure and retain the outer crate in the working position, the securing arrangement comprising at least one resilient member secured at opposing ends on opposing edge portions of a first panel among the top panel and the bottom panel, said at least one resilient member being resiliently deformable between (i) a first configuration extending across an exterior of the first panel so as not to obstruct displacement of the outer crate between the working position and the collapsed position, and (ii) a second configuration extending across an exterior of a second panel among the top panel and the bottom panel while the outer crate is in the collapsed position so as to prevent displacement of the outer crate from the collapsed position to the working position.

18. The apparatus according to claim 1 wherein the outer crate comprises a camera mount supported on one of the rigid panels and supporting a camera thereon such that the camera is arranged to capture images of an interior of the outer crate, the camera being removable from an exterior of the outer crate.

* * * * *